(12) United States Patent
Shakya et al.

(10) Patent No.: US 8,872,764 B2
(45) Date of Patent: Oct. 28, 2014

(54) ILLUMINATION SYSTEMS INCORPORATING A LIGHT GUIDE AND A REFLECTIVE STRUCTURE AND RELATED METHODS

(75) Inventors: Jyotindra Raj Shakya, Sunnyvale, CA (US); Russel Allyn Martin, Menlo Park, CA (US); Ion Bita, San Jose, CA (US); Donald John Elloway, Campbell, CA (US); Rashmi Raghavendra Rao, Santa Clara, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 242 days.

(21) Appl. No.: 13/538,642

(22) Filed: Jun. 29, 2012

(65) Prior Publication Data

US 2014/0002345 A1     Jan. 2, 2014

(51) Int. Cl.
G09G 5/00     (2006.01)

(52) U.S. Cl.
USPC ................................. 345/156; 345/174

(58) Field of Classification Search
CPC ........... G06F 3/01; G06F 3/011; G06F 3/016; G06F 3/038; G06F 3/044; G06F 3/045
USPC ................. 345/156–169, 173–178
See application file for complete search history.

(56) References Cited

U.S. PATENT DOCUMENTS

| | | | |
|---|---|---|---|
| 6,277,679 B1 | 8/2001 | Ohtani et al. | |
| 6,297,811 B1 | 10/2001 | Kent et al. | |
| 6,777,273 B1 | 8/2004 | Koyama et al. | |
| 7,129,935 B2 | 10/2006 | Mackey | |
| 7,750,886 B2 * | 7/2010 | Sampsell | 345/102 |
| 7,768,617 B2 * | 8/2010 | Yamazaki et al. | 349/147 |
| 7,943,202 B2 | 5/2011 | Chui et al. | |
| 8,004,499 B2 | 8/2011 | Geaghan et al. | |
| 8,031,290 B2 | 10/2011 | Fu | |
| 8,484,838 B2 | 7/2013 | Badaye et al. | |
| 2006/0066783 A1 | 3/2006 | Sampsell | |
| 2007/0263137 A1 | 11/2007 | Shigeta et al. | |
| 2007/0279395 A1 | 12/2007 | Philipp et al. | |

(Continued)

FOREIGN PATENT DOCUMENTS

| | | |
|---|---|---|
| EP | 1 118 902 | 7/2001 |
| EP | 2075678 A2 | 7/2009 |
| EP | 2113827 A2 | 11/2009 |

OTHER PUBLICATIONS

International Search Report and Written Opinion—PCT/US2013/042242—ISA/EPO—Sep. 4, 2013.

(Continued)

*Primary Examiner* — Vijay Shankar
(74) *Attorney, Agent, or Firm* — Weaver Austin Villeneuve & Sampson, LLP

(57) ABSTRACT

This disclosure provides systems and methods for illumination systems with one or more reflective structures over a light guide. In one aspect, each reflective structure can have an absorber structure with a width greater than a width of the reflective structure. The absorber structure can have overhanging portions that are in parallel with and laterally protrude past one or more edges of the reflective structure, or the absorber structure can have enclosing portions that substantially enclose the reflective structure. The reflective structures can include light-turning features, such as facets, and/or conductive wires, such as touch sensor wires.

32 Claims, 16 Drawing Sheets

(56) References Cited

U.S. PATENT DOCUMENTS

| | | |
|---|---|---|
| 2008/0042288 A1 | 2/2008 | Yamazaki et al. |
| 2009/0126777 A1 | 5/2009 | Khazeni et al. |
| 2009/0219258 A1 | 9/2009 | Geaghan et al. |
| 2010/0026655 A1 | 2/2010 | Harley |
| 2010/0156811 A1 | 6/2010 | Long et al. |
| 2010/0157406 A1 | 6/2010 | Gruhlke et al. |
| 2010/0214247 A1 | 8/2010 | Tang et al. |
| 2010/0302803 A1 | 12/2010 | Bita et al. |
| 2011/0018557 A1 | 1/2011 | Badaye |
| 2011/0090172 A1 | 4/2011 | Kaya et al. |
| 2011/0095990 A1 | 4/2011 | Philipp et al. |
| 2011/0095997 A1 | 4/2011 | Philipp |
| 2011/0102370 A1 | 5/2011 | Kono et al. |
| 2011/0157058 A1 | 6/2011 | Bita et al. |
| 2011/0265564 A1 | 11/2011 | Acar et al. |
| 2011/0279400 A1 | 11/2011 | Yilmaz |
| 2012/0081324 A1 | 4/2012 | Philipp |
| 2012/0120081 A1 | 5/2012 | Bita et al. |
| 2013/0127744 A1 | 5/2013 | Shakya et al. |
| 2013/0321433 A1 | 12/2013 | Bita et al. |

OTHER PUBLICATIONS

Partial International Search Report—PCT/US2013/047359—ISA/EPO—Sep. 6, 2013.

International Search Report and Written Opinion—PCT/US2013/047359—ISA/EPO—Oct. 31, 2013.

\* cited by examiner

Common Voltages

| | $VC_{ADD\_H}$ | $VC_{HOLD\_H}$ | $VC_{REL}$ | $VC_{HOLD\_L}$ | $VC_{ADD\_L}$ |
|---|---|---|---|---|---|
| $VS_H$ | Stable | Stable | Relax | Stable | Actuate |
| $VS_L$ | Actuate | Stable | Relax | Stable | Stable |

ILLUMINATION SYSTEMS INCORPORATING A LIGHT GUIDE AND A REFLECTIVE STRUCTURE AND RELATED METHODS

TECHNICAL FIELD

This disclosure relates generally to illumination systems, including illumination systems for display devices, and to electromechanical systems.

DESCRIPTION OF THE RELATED TECHNOLOGY

Electromechanical systems include devices having electrical and mechanical elements, actuators, transducers, sensors, optical components (e.g., mirrors) and electronics. Electromechanical systems can be manufactured at a variety of scales including, but not limited to, microscales and nanoscales. For example, microelectromechanical systems (MEMS) devices can include structures having sizes ranging from about a micron to hundreds of microns or more. Nanoelectromechanical systems (NEMS) devices can include structures having sizes smaller than a micron including, for example, sizes smaller than several hundred nanometers. Electromechanical elements may be created using deposition, etching, lithography, and/or other micromachining processes that etch away parts of substrates and/or deposited material layers, or that add layers to form electrical and electromechanical devices.

One type of electromechanical systems device is called an interferometric modulator (IMOD). As used herein, the term interferometric modulator or interferometric light modulator refers to a device that selectively absorbs and/or reflects light using the principles of optical interference. In some implementations, an interferometric modulator may include a pair of conductive plates, one or both of which may be transparent and/or reflective, wholly or in part, and capable of relative motion upon application of an appropriate electrical signal. In an implementation, one plate may include a stationary layer deposited on a substrate and the other plate may include a reflective membrane separated from the stationary layer by an air gap. The position of one plate in relation to another can change the optical interference of light incident on the interferometric modulator. Interferometric modulator devices have a wide range of applications, and are anticipated to be used in improving existing products and creating new products, especially those with display capabilities.

Reflected ambient light is used to form images in some display devices, such as those using pixels formed by interferometric modulators. In low ambient light conditions, light from an artificial source can be used to illuminate the reflective pixels, which can then reflect the light towards a viewer to generate an image. Some illumination systems can be integrated with touch sensor electronics. To meet market demands and design criteria, new illumination systems are continually being developed to meet the needs of display devices, including reflective and transmissive displays.

SUMMARY

The systems, methods and devices of the disclosure each have several innovative aspects, no single one of which is solely responsible for the desirable attributes disclosed herein.

One innovative aspect of the subject matter described in this disclosure can be implemented in an illumination system.

The illumination system includes a light guide having a light input edge capable of receiving light from a light source, an opposing edge opposite the light input edge, and transverse edges transverse to the light input edge and opposing edge; a reflective structure over a portion of one of the transverse edges of the light guide; and an absorber structure over the reflective structure, where the absorber structure has a width greater than a width of the reflective structure.

In some implementations, the absorber structure includes at least one overhanging portion substantially parallel with and laterally protruding past one or more edges of the reflective structure. The overhanging portions can laterally protrude past the one or more edges of the reflective structure by a distance between about 100 nm and about 1000 nm. In some implementations, the absorber structure includes a black mask structure. In some implementations, the reflective structure is part of a touch sensor wire. In some implementations, the light guide forms part of a front light of a reflective display.

Another innovative aspect of the subject matter described in this disclosure can be implemented in a display system. The display system includes means for propagating light, where the light propagating means includes means for redirecting light; means for reflecting light over light propagating means; means for absorbing light over the light reflecting means, where the light absorbing means has a width greater than a width of the light reflecting means; and a display facing a major surface of the light propagating means, where light redirecting means are configured to direct light to the display.

In some implementations, the display system further comprises a transparent layer, the light redirecting means in the transparent layer and the light reflecting means above the transparent layer. In some implementations, the light absorbing means includes at least one overhanging portion substantially parallel with and laterally protruding past one or more edges of the light reflecting means. In some implementations, the light absorbing means includes enclosing portions that substantially enclose the light reflecting means.

Another innovative aspect of the subject matter described in this disclosure can be implemented in a method of manufacturing an illumination system. The method includes providing a light guide, where the light guide includes a light input edge for receiving light from a light source, an opposing edge opposite the light input edge, and transverse edges transverse to the light input edge and the opposing edge; providing a reflective structure over a portion of one of the transverse edges of the light guide; and providing an absorber structure over the reflective structure, where the absorber structure has a width greater than a width of the reflective structure.

In some implementations, the method further comprises providing an etch stop layer between the reflective structure and the absorber structure. In some implementations, providing the reflective structure includes depositing an electrically conductive material. In some implementations, providing the absorber structure includes providing overhanging portions substantially parallel with and laterally protruding one or more edges of the reflective structure.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
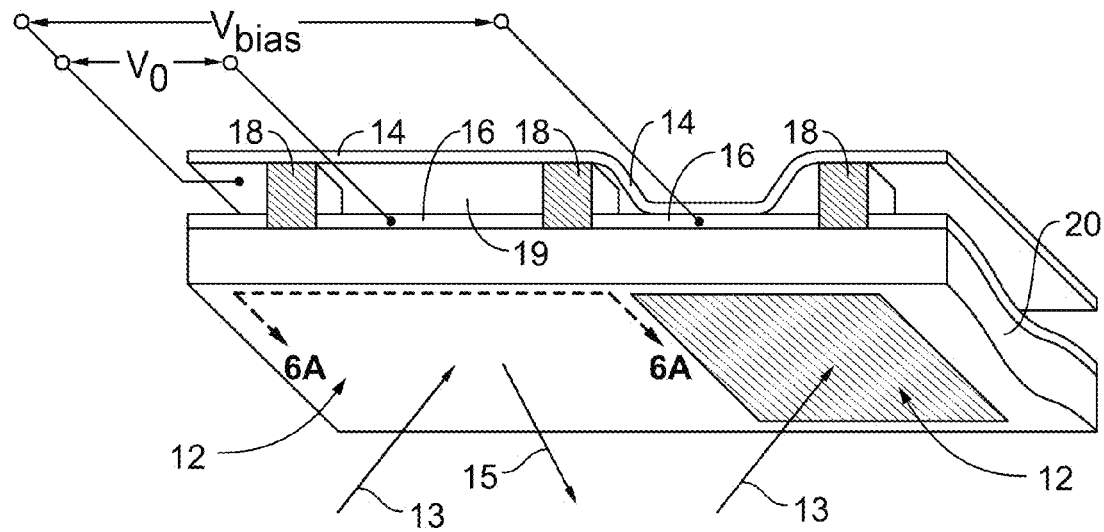
FIG. 1 shows an example of an isometric view depicting two adjacent pixels in a series of pixels of an interferometric modulator (IMOD) display device.

The following detailed description is directed to certain implementations for the purposes of describing the innovative aspects. However, the teachings herein can be applied in a multitude of different ways. The described implementations may be implemented in any device that is configured to display an image, whether in motion (e.g., video) or stationary (e.g., still image), and whether textual, graphical or pictorial. More particularly, it is contemplated that the implementations may be implemented in or associated with a variety of electronic devices such as, but not limited to, mobile telephones, multimedia Internet enabled cellular telephones, mobile television receivers, wireless devices, smartphones, bluetooth devices, personal data assistants (PDAs), wireless electronic mail receivers, hand-held or portable computers, netbooks, notebooks, smartbooks, tablets, printers, copiers, scanners, facsimile devices, GPS receivers/navigators, cameras, MP3 players, camcorders, game consoles, wrist watches, clocks, calculators, television monitors, flat panel displays, electronic reading devices (e.g., e-readers), computer monitors, auto displays (e.g., odometer display, etc.), cockpit controls and/or displays, camera view displays (e.g., display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (e.g., electromechanical systems (EMS), MEMS and non-MEMS), aesthetic structures (e.g., display of images on a piece of jewelry) and a variety of electromechanical systems devices. The teachings herein also can be used in non-display applications such as, but not limited to, electronic switching devices, radio frequency filters, sensors, accelerometers, gyroscopes, motion-sensing devices, magnetometers, inertial components for consumer electronics, parts of consumer electronics products, varactors, liquid crystal devices, electrophoretic devices, drive schemes, manufacturing processes, electronic test equipment. Thus, the teachings are not intended to be limited to the implementations depicted solely in the Figures, but instead have wide applicability as will be readily apparent to one having ordinary skill in the art.

Some implementations described herein relate to illumination systems with one or more reflective structures over a light guide. In some implementations, the reflective structures can include light-turning features, such as facets, and/or conductive wires, such as touch sensor wires. The reflective structures can each have an absorber structure capable of minimizing edge scattering of light. The absorber structure can have a width greater than a width of the reflective structure. In some implementations, the absorber structure can have overhanging portions that are in parallel with and laterally protrude past one or more edges of the reflective structure. In some implementations, the absorber structure can have enclosing portions that substantially enclose the reflective structure.

Some of the particular implementations of the subject matter described in this disclosure can be implemented to realize one or more of the following potential advantages. Providing an absorber structure over a reflective structure, where the absorber structure has a width greater than a width of the reflective structure, can serve to absorb light that scatters from one or more edges of the reflective structure. Thus, such a configuration of an absorber structure can reduce visual artifacts and minimize undesirable leakage of light from a light guide. As a result, this can reduce local non-uniformities across a display and improve contrast ratio.

An example of a suitable EMS or MEMS device, to which the described implementations may apply, is a reflective display device. Reflective display devices can incorporate interferometric modulators (IMODs) to selectively absorb and/or reflect light incident thereon using principles of optical interference. IMODs can include an absorber, a reflector that is movable with respect to the absorber, and an optical resonant cavity defined between the absorber and the reflector. The reflector can be moved to two or more different positions, which can change the size of the optical resonant cavity and thereby affect the reflectance of the interferometric modulator. The reflectance spectrums of IMODs can create fairly broad spectral bands which can be shifted across the visible wavelengths to generate different colors. The position of the spectral band can be adjusted by changing the thickness of the optical resonant cavity, i.e., by changing the position of the reflector.

FIG. 1 shows an example of an isometric view depicting two adjacent pixels in a series of pixels of an interferometric modulator (IMOD) display device. The IMOD display device includes one or more interferometric MEMS display elements. In these devices, the pixels of the MEMS display elements can be in either a bright or dark state. In the bright ("relaxed," "open" or "on") state, the display element reflects a large portion of incident visible light, e.g., to a user. Conversely, in the dark ("actuated," "closed" or "off") state, the display element reflects little incident visible light. In some implementations, the light reflectance properties of the on and off states may be reversed. MEMS pixels can be configured to reflect predominantly at particular wavelengths allowing for a color display in addition to black and white.

The IMOD display device can include a row/column array of IMODs. Each IMOD can include a pair of reflective layers, i.e., a movable reflective layer and a fixed partially reflective layer, positioned at a variable and controllable distance from each other to form an air gap (also referred to as an optical gap or cavity). The movable reflective layer may be moved between at least two positions. In a first position, i.e., a relaxed position, the movable reflective layer can be positioned at a relatively large distance from the fixed partially reflective layer. In a second position, i.e., an actuated position, the movable reflective layer can be positioned more closely to the partially reflective layer. Incident light that reflects from the two layers can interfere constructively or destructively depending on the position of the movable reflective layer, producing either an overall reflective or non-reflective state for each pixel. In some implementations, the IMOD may be in a reflective state when unactuated, reflecting light within the visible spectrum, and may be in a dark state when unactuated, reflecting light outside of the visible range (e.g., infrared light). In some other implementations, however, an IMOD may be in a dark state when unactuated, and in a reflective state when actuated. In some implementations, the introduction of an applied voltage can drive the pixels to change states. In some other implementations, an applied charge can drive the pixels to change states.

The depicted portion of the pixel array in FIG. 1 includes two adjacent interferometric modulators 12. In the IMOD 12 on the left (as illustrated), a movable reflective layer 14 is illustrated in a relaxed position at a predetermined distance from an optical stack 16, which includes a partially reflective layer. The voltage $V_0$ applied across the IMOD 12 on the left is insufficient to cause actuation of the movable reflective layer 14. In the IMOD 12 on the right, the movable reflective layer 14 is illustrated in an actuated position near or adjacent the optical stack 16. The voltage $V_{bias}$ applied across the IMOD 12 on the right is sufficient to maintain the movable reflective layer 14 in the actuated position.

In FIG. 1, the reflective properties of pixels 12 are generally illustrated with arrows 13 indicating light incident upon the pixels 12, and light 15 reflecting from the IMOD 12 on the left. Although not illustrated in detail, it will be understood by one having ordinary skill in the art that most of the light 13 incident upon the pixels 12 will be transmitted through the transparent substrate 20, toward the optical stack 16. A portion of the light incident upon the optical stack 16 will be transmitted through the partially reflective layer of the optical stack 16, and a portion will be reflected back through the transparent substrate 20. The portion of light 13 that is transmitted through the optical stack 16 will be reflected at the movable reflective layer 14, back toward (and through) the transparent substrate 20. Interference (constructive or destructive) between the light reflected from the partially reflective layer of the optical stack 16 and the light reflected from the movable reflective layer 14 will determine the wavelength(s) of light 15 reflected from the IMOD 12.

The optical stack 16 can include a single layer or several layers. The layer(s) can include one or more of an electrode layer, a partially reflective and partially transmissive layer and a transparent dielectric layer. In some implementations, the optical stack 16 is electrically conductive, partially transparent and partially reflective, and may be fabricated, for example, by depositing one or more of the above layers onto a transparent substrate 20. The electrode layer can be formed from a variety of materials, such as various metals, for example indium tin oxide (ITO). The partially reflective layer can be formed from a variety of materials that are partially reflective, such as various metals, e.g., chromium (Cr), semiconductors, and dielectrics. The partially reflective layer can be formed of one or more layers of materials, and each of the layers can be formed of a single material or a combination of materials. In some implementations, the optical stack 16 can include a single semi-transparent thickness of metal or semiconductor which serves as both an optical absorber and conductor, while different, more conductive layers or portions (e.g., of the optical stack 16 or of other structures of the IMOD) can serve to bus signals between IMOD pixels. The optical stack 16 also can include one or more insulating or dielectric layers covering one or more conductive layers or a conductive/absorptive layer.

In some implementations, the layer(s) of the optical stack 16 can be patterned into parallel strips, and may form row electrodes in a display device as described further below. As will be understood by one having skill in the art, the term "patterned" is used herein to refer to masking as well as etching processes. In some implementations, a highly conductive and reflective material, such as aluminum (Al), may be used for the movable reflective layer 14, and these strips may form column electrodes in a display device. The movable reflective layer 14 may be formed as a series of parallel strips of a deposited metal layer or layers (orthogonal to the row electrodes of the optical stack 16) to form columns deposited on top of posts 18 and an intervening sacrificial material deposited between the posts 18. When the sacrificial material is etched away, a defined gap 19, or optical cavity, can be formed between the movable reflective layer 14 and the optical stack 16. In some implementations, the spacing between posts 18 may be approximately 1-1000 um, while the gap 19 may be less than 10,000 Angstroms (Å).

In some implementations, each pixel of the IMOD, whether in the actuated or relaxed state, is essentially a capacitor formed by the fixed and moving reflective layers. When no voltage is applied, the movable reflective layer 14 remains in a mechanically relaxed state, as illustrated by the IMOD 12 on the left in FIG. 1, with the gap 19 between the movable reflective layer 14 and optical stack 16. However, when a potential difference, e.g., voltage, is applied to at least one of a selected row and column, the capacitor formed at the intersection of the row and column electrodes at the corresponding pixel becomes charged, and electrostatic forces pull the electrodes together. If the applied voltage exceeds a threshold, the movable reflective layer 14 can deform and move near or against the optical stack 16. A dielectric layer (not shown) within the optical stack 16 may prevent shorting and control the separation distance between the layers 14 and 16, as illustrated by the actuated IMOD 12 on the right in FIG. 1. The behavior is the same regardless of the polarity of the applied potential difference. Though a series of pixels in an array may be referred to in some instances as "rows" or "columns," a person having ordinary skill in the art will readily understand that referring to one direction as a "row" and another as a "column" is arbitrary. Restated, in some orientations, the rows can be considered columns, and the columns considered to be rows. Furthermore, the display elements may be evenly arranged in orthogonal rows and columns (an "array"), or arranged in non-linear configurations, for example, having certain positional offsets with respect to one another (a "mosaic"). The terms "array" and "mosaic" may refer to either configuration. Thus, although the display is referred to as including an "array" or "mosaic," the elements themselves need not be arranged orthogonally to one another, or disposed in an even distribution, in any instance, but may include arrangements having asymmetric shapes and unevenly distributed elements.

Figure 2:
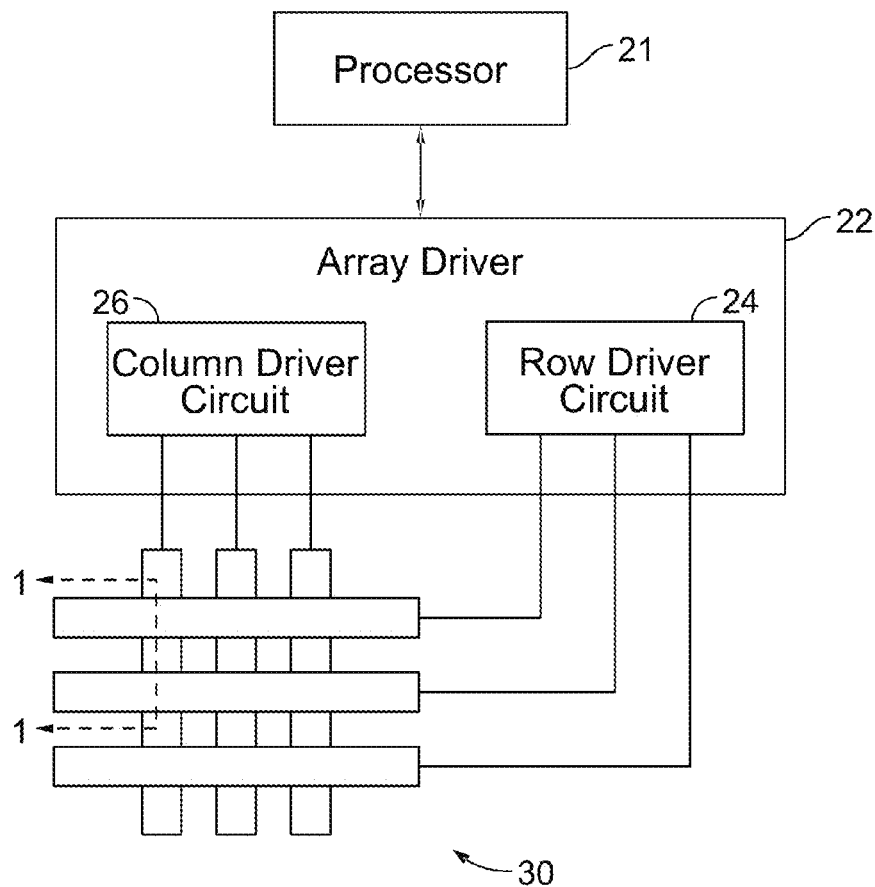
FIG. 2 shows an example of a system block diagram illustrating an electronic device incorporating a 3×3 interferometric modulator display.

FIG. 2 shows an example of a system block diagram illustrating an electronic device incorporating a 3×3 interferometric modulator display. The electronic device includes a processor 21 that may be configured to execute one or more software modules. In addition to executing an operating system, the processor 21 may be configured to execute one or more software applications, including a web browser, a telephone application, an email program, or other software application.

The processor 21 can be configured to communicate with an array driver 22. The array driver 22 can include a row driver circuit 24 and a column driver circuit 26 that provide signals to, e.g., a display array or panel 30. The cross section of the IMOD display device illustrated in FIG. 1 is shown by the lines 1-1 in FIG. 2. Although FIG. 2 illustrates a 3×3 array of IMODs for the sake of clarity, the display array 30 may contain a very large number of IMODs, and may have a different number of IMODs in rows than in columns, and vice versa.

Figures 3, 4:
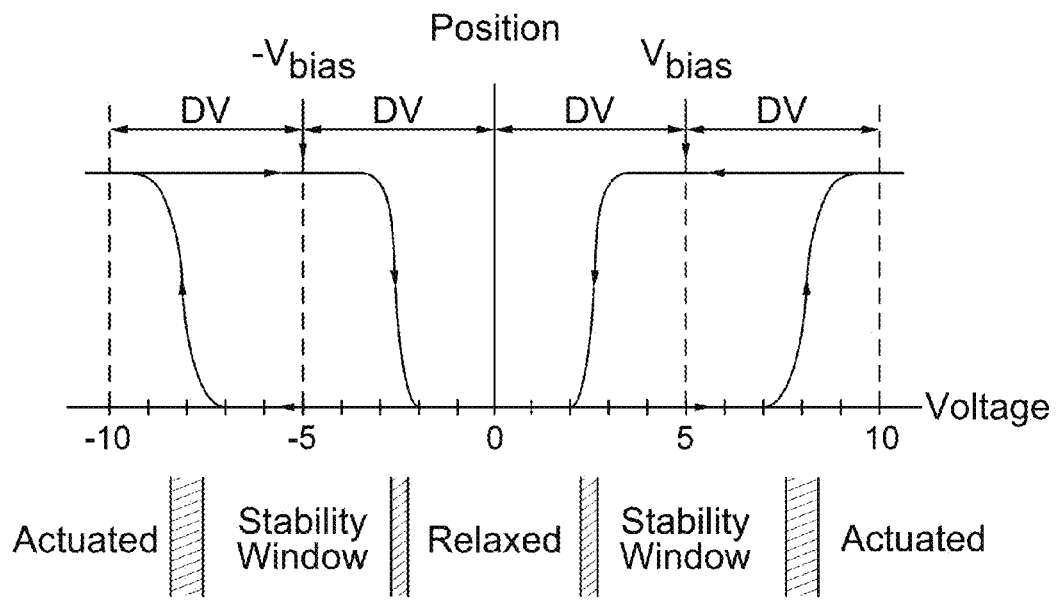
FIG. 3 shows an example of a diagram illustrating movable reflective layer position versus applied voltage for the interferometric modulator of FIG. 1.
FIG. 4 shows an example of a table illustrating various states of an interferometric modulator when various common and segment voltages are applied.

FIG. 3 shows an example of a diagram illustrating movable reflective layer position versus applied voltage for the interferometric modulator of FIG. 1. For MEMS interferometric modulators, the row/column (i.e., common/segment) write procedure may take advantage of a hysteresis property of these devices as illustrated in FIG. 3. An interferometric modulator may require, for example, about a 10-volt potential difference to cause the movable reflective layer, or mirror, to change from the relaxed state to the actuated state. When the voltage is reduced from that value, the movable reflective layer maintains its state as the voltage drops back below, e.g., 10 volts, however, the movable reflective layer does not relax completely until the voltage drops below 2 volts. Thus, a range of voltage, approximately 3 to 7 volts, as shown in FIG. 3, exists where there is a window of applied voltage within which the device is stable in either the relaxed or actuated state. This is referred to herein as the "hysteresis window" or "stability window." For a display array 30 having the hysteresis characteristics of FIG. 3, the row/column write procedure can be designed to address one or more rows at a time, such that during the addressing of a given row, pixels in the addressed row that are to be actuated are exposed to a voltage difference of about 10 volts, and pixels that are to be relaxed are exposed to a voltage difference of near zero volts. After addressing, the pixels are exposed to a steady state or bias voltage difference of approximately 5-volts such that they remain in the previous strobing state. In this example, after being addressed, each pixel sees a potential difference within the "stability window" of about 3-7 volts. This hysteresis property feature enables the pixel design, e.g., illustrated in FIG. 1, to remain stable in either an actuated or relaxed pre-existing state under the same applied voltage conditions. Since each IMOD pixel, whether in the actuated or relaxed state, is essentially a capacitor formed by the fixed and moving reflective layers, this stable state can be held at a steady voltage within the hysteresis window without substantially consuming or losing power. Moreover, essentially little or no current flows into the IMOD pixel if the applied voltage potential remains substantially fixed.

In some implementations, a frame of an image may be created by applying data signals in the form of "segment" voltages along the set of column electrodes, in accordance with the desired change (if any) to the state of the pixels in a given row. Each row of the array can be addressed in turn, such that the frame is written one row at a time. To write the desired data to the pixels in a first row, segment voltages corresponding to the desired state of the pixels in the first row can be applied on the column electrodes, and a first row pulse in the form of a specific "common" voltage or signal can be applied to the first row electrode. The set of segment voltages can then be changed to correspond to the desired change (if any) to the state of the pixels in the second row, and a second common voltage can be applied to the second row electrode. In some implementations, the pixels in the first row are unaffected by the change in the segment voltages applied along the column electrodes, and remain in the state they were set to during the first common voltage row pulse. This process may be repeated for the entire series of rows, or alternatively, columns, in a sequential fashion to produce the image frame. The frames can be refreshed and/or updated with new image data by continually repeating this process at some desired number of frames per second.

The combination of segment and common signals applied across each pixel (that is, the potential difference across each pixel) determines the resulting state of each pixel. FIG. 4 shows an example of a table illustrating various states of an interferometric modulator when various common and segment voltages are applied. As will be readily understood by one having ordinary skill in the art, the "segment" voltages can be applied to either the column electrodes or the row electrodes, and the "common" voltages can be applied to the other of the column electrodes or the row electrodes.

As illustrated in FIG. 4 (as well as in the timing diagram shown in FIG. 5B), when a release voltage $VC_{REL}$ is applied along a common line, all interferometric modulator elements along the common line will be placed in a relaxed state, alternatively referred to as a released or unactuated state, regardless of the voltage applied along the segment lines, i.e., high segment voltage $VS_H$ and low segment voltage $VS_L$. In particular, when the release voltage $VC_{REL}$ is applied along a common line, the potential voltage across the modulator (alternatively referred to as a pixel voltage) is within the relaxation window (see FIG. 3, also referred to as a release window) both when the high segment voltage $VS_H$ and the low segment voltage $VS_L$ are applied along the corresponding segment line for that pixel.

When a hold voltage is applied on a common line, such as a high hold voltage $VC_{HOLD\_H}$ or a low hold voltage $VC_{HOLD\_L}$, the state of the interferometric modulator will remain constant. For example, a relaxed IMOD will remain in a relaxed position, and an actuated IMOD will remain in an actuated position. The hold voltages can be selected such that the pixel voltage will remain within a stability window both when the high segment voltage $VS_H$ and the low segment voltage $VS_L$ are applied along the corresponding segment line. Thus, the segment voltage swing, i.e., the difference between the high $VS_H$ and low segment voltage $VS_L$, is less than the width of either the positive or the negative stability window.

When an addressing, or actuation, voltage is applied on a common line, such as a high addressing voltage $VC_{ADD\_H}$ or a low addressing voltage $VC_{ADD\_L}$, data can be selectively written to the modulators along that line by application of segment voltages along the respective segment lines. The segment voltages may be selected such that actuation is dependent upon the segment voltage applied. When an addressing voltage is applied along a common line, application of one segment voltage will result in a pixel voltage within a stability window, causing the pixel to remain unactuated. In contrast, application of the other segment voltage will result in a pixel voltage beyond the stability window, resulting in actuation of the pixel. The particular segment voltage which causes actuation can vary depending upon which addressing voltage is used. In some implementations, when the high addressing voltage $VC_{ADD\_H}$ is applied along the common line, application of the high segment voltage $VS_H$ can cause a modulator to remain in its current position, while application of the low segment voltage $VS_L$ can cause actuation of the modulator. As a corollary, the effect of the segment voltages can be the opposite when a low addressing voltage $VC_{ADD\_L}$ is applied, with high segment voltage $VS_H$ causing actuation of the modulator, and low segment voltage $VS_L$ having no effect (i.e., remaining stable) on the state of the modulator.

In some implementations, hold voltages, address voltages, and segment voltages may be used which always produce the same polarity potential difference across the modulators. In some other implementations, signals can be used which alternate the polarity of the potential difference of the modulators. Alternation of the polarity across the modulators (that is, alternation of the polarity of write procedures) may reduce or inhibit charge accumulation which could occur after repeated write operations of a single polarity.

Figure 5A:
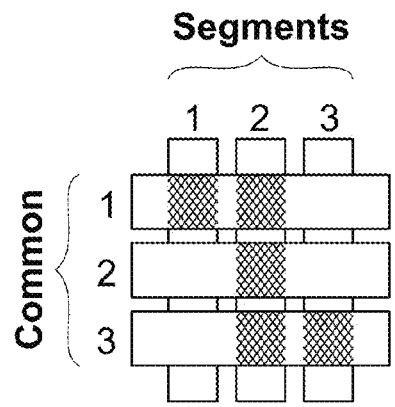
FIG. 5A shows an example of a diagram illustrating a frame of display data in the 3×3 interferometric modulator display of FIG. 2.
Figure 5B:
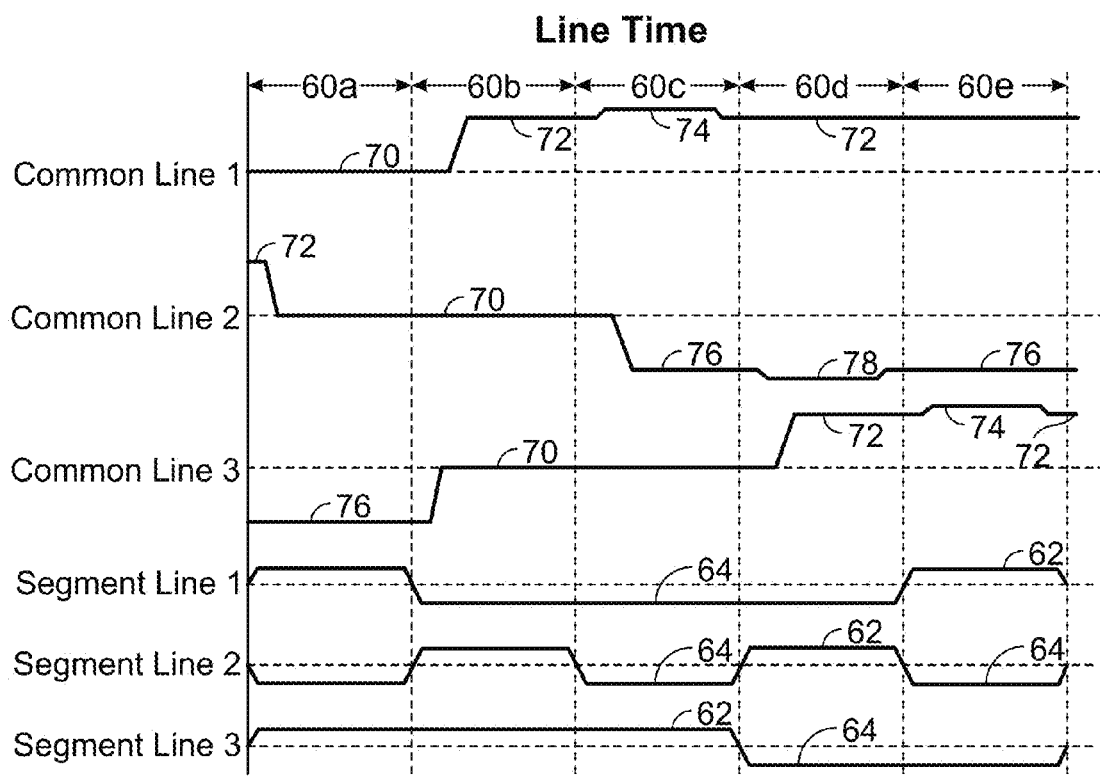
FIG. 5B shows an example of a timing diagram for common and segment signals that may be used to write the frame of display data illustrated in FIG. 5A.

FIG. 5A shows an example of a diagram illustrating a frame of display data in the 3×3 interferometric modulator display of FIG. 2. FIG. 5B shows an example of a timing diagram for common and segment signals that may be used to write the frame of display data illustrated in FIG. 5A. The signals can be applied to the, e.g., 3×3 array of FIG. 2, which will ultimately result in the line time 60e display arrangement illustrated in FIG. 5A. The actuated modulators in FIG. 5A are in a dark-state, i.e., where a substantial portion of the reflected light is outside of the visible spectrum so as to result in a dark appearance to, e.g., a viewer. Prior to writing the frame illustrated in FIG. 5A, the pixels can be in any state, but the write procedure illustrated in the timing diagram of FIG. 5B presumes that each modulator has been released and resides in an unactuated state before the first line time 60a.

During the first line time 60a, a release voltage 70 is applied on common line 1; the voltage applied on common line 2 begins at a high hold voltage 72 and moves to a release voltage 70; and a low hold voltage 76 is applied along common line 3. Thus, the modulators (common 1, segment 1), (1,2) and (1,3) along common line 1 remain in a relaxed, or unactuated, state for the duration of the first line time 60a, the modulators (2,1), (2,2) and (2,3) along common line 2 will move to a relaxed state, and the modulators (3,1), (3,2) and (3,3) along common line 3 will remain in their previous state. With reference to FIG. 4, the segment voltages applied along segment lines 1, 2 and 3 will have no effect on the state of the interferometric modulators, as none of common lines 1, 2 or 3 are being exposed to voltage levels causing actuation during line time 60a (i.e., $VC_{REL}$—relax and $VC_{HOLD\_L}$—stable).

During the second line time 60b, the voltage on common line 1 moves to a high hold voltage 72, and all modulators along common line 1 remain in a relaxed state regardless of the segment voltage applied because no addressing, or actuation, voltage was applied on the common line 1. The modulators along common line 2 remain in a relaxed state due to the application of the release voltage 70, and the modulators (3,1), (3,2) and (3,3) along common line 3 will relax when the voltage along common line 3 moves to a release voltage 70.

During the third line time 60c, common line 1 is addressed by applying a high address voltage 74 on common line 1. Because a low segment voltage 64 is applied along segment lines 1 and 2 during the application of this address voltage, the pixel voltage across modulators (1,1) and (1,2) is greater than the high end of the positive stability window (i.e., the voltage differential exceeded a predefined threshold) of the modulators, and the modulators (1,1) and (1,2) are actuated. Conversely, because a high segment voltage 62 is applied along segment line 3, the pixel voltage across modulator (1,3) is less than that of modulators (1,1) and (1,2), and remains within the positive stability window of the modulator; modulator (1,3) thus remains relaxed. Also during line time 60c, the voltage along common line 2 decreases to a low hold voltage 76, and the voltage along common line 3 remains at a release voltage 70, leaving the modulators along common lines 2 and 3 in a relaxed position.

During the fourth line time 60d, the voltage on common line 1 returns to a high hold voltage 72, leaving the modulators along common line 1 in their respective addressed states. The voltage on common line 2 is decreased to a low address voltage 78. Because a high segment voltage 62 is applied along segment line 2, the pixel voltage across modulator (2,2) is below the lower end of the negative stability window of the modulator, causing the modulator (2,2) to actuate. Conversely, because a low segment voltage 64 is applied along segment lines 1 and 3, the modulators (2,1) and (2,3) remain in a relaxed position. The voltage on common line 3 increases to a high hold voltage 72, leaving the modulators along common line 3 in a relaxed state.

Finally, during the fifth line time 60e, the voltage on common line 1 remains at high hold voltage 72, and the voltage on common line 2 remains at a low hold voltage 76, leaving the modulators along common lines 1 and 2 in their respective addressed states. The voltage on common line 3 increases to a high address voltage 74 to address the modulators along common line 3. As a low segment voltage 64 is applied on segment lines 2 and 3, the modulators (3,2) and (3,3) actuate, while the high segment voltage 62 applied along segment line 1 causes modulator (3,1) to remain in a relaxed position. Thus, at the end of the fifth line time 60e, the 3×3 pixel array is in the state shown in FIG. 5A, and will remain in that state as long as the hold voltages are applied along the common lines, regardless of variations in the segment voltage which may occur when modulators along other common lines (not shown) are being addressed.

In the timing diagram of FIG. 5B, a given write procedure (i.e., line times 60a-60e) can include the use of either high hold and address voltages, or low hold and address voltages. Once the write procedure has been completed for a given common line (and the common voltage is set to the hold voltage having the same polarity as the actuation voltage), the pixel voltage remains within a given stability window, and does not pass through the relaxation window until a release voltage is applied on that common line. Furthermore, as each modulator is released as part of the write procedure prior to addressing the modulator, the actuation time of a modulator, rather than the release time, may determine the necessary line time. Specifically, in implementations in which the release time of a modulator is greater than the actuation time, the release voltage may be applied for longer than a single line time, as depicted in FIG. 5B. In some other implementations, voltages applied along common lines or segment lines may vary to account for variations in the actuation and release voltages of different modulators, such as modulators of different colors.

Figure 6A:
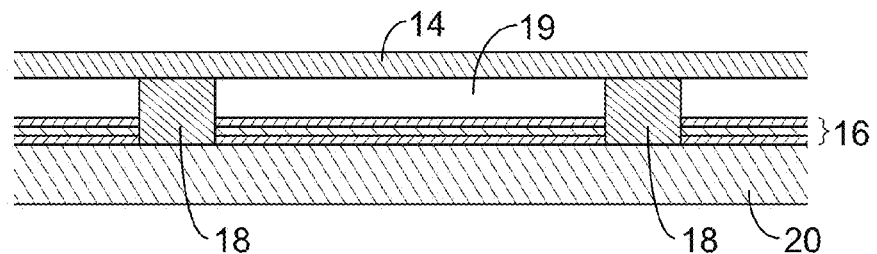
FIG. 6A shows an example of a partial cross-section of the interferometric modulator display of FIG. 1.
Figure 6B:
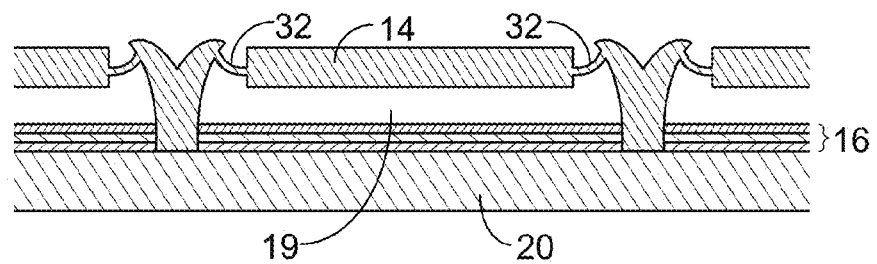
FIGS. 6B-6E show examples of cross-sections of varying implementations of interferometric modulators.
Figure 6C:
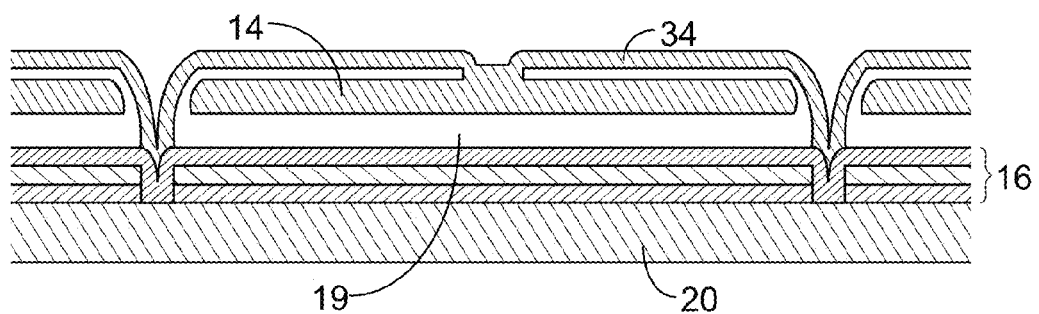

The details of the structure of interferometric modulators that operate in accordance with the principles set forth above may vary widely. For example, FIGS. 6A-6E show examples of cross-sections of varying implementations of interferometric modulators, including the movable reflective layer 14 and its supporting structures. FIG. 6A shows an example of a partial cross-section of the interferometric modulator display of FIG. 1, where a strip of metal material, i.e., the movable reflective layer 14 is deposited on supports 18 extending orthogonally from the substrate 20. In FIG. 6B, the movable reflective layer 14 of each IMOD is generally square or rectangular in shape and attached to supports at or near the corners, on tethers 32. In FIG. 6C, the movable reflective layer 14 is generally square or rectangular in shape and suspended from a deformable layer 34, which may include a flexible metal. The deformable layer 34 can connect, directly or indirectly, to the substrate 20 around the perimeter of the movable reflective layer 14. These connections are herein referred to as support posts. The implementation shown in FIG. 6C has additional benefits deriving from the decoupling of the optical functions of the movable reflective layer 14 from its mechanical functions, which are carried out by the deformable layer 34. This decoupling allows the structural design and materials used for the reflective layer 14 and those used for the deformable layer 34 to be optimized independently of one another.

Figure 6D:
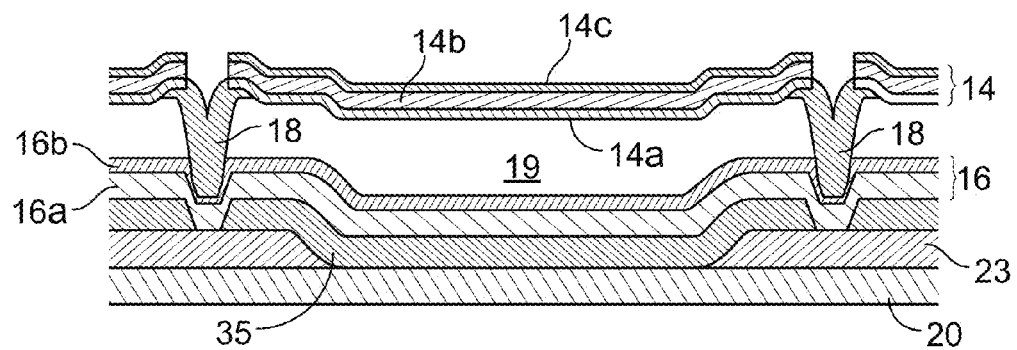

FIG. 6D shows another example of an IMOD, where the movable reflective layer 14 includes a reflective sub-layer 14a. The movable reflective layer 14 rests on a support structure, such as support posts 18. The support posts 18 provide separation of the movable reflective layer 14 from the lower stationary electrode (i.e., part of the optical stack 16 in the illustrated IMOD) so that a gap 19 is formed between the movable reflective layer 14 and the optical stack 16, for example when the movable reflective layer 14 is in a relaxed position. The movable reflective layer 14 also can include a conductive layer 14c, which may be configured to serve as an electrode, and a support layer 14b. In this example, the conductive layer 14c is disposed on one side of the support layer 14b, distal from the substrate 20, and the reflective sub-layer 14a is disposed on the other side of the support layer 14b, proximal to the substrate 20. In some implementations, the reflective sub-layer 14a can be conductive and can be disposed between the support layer 14b and the optical stack 16. The support layer 14b can include one or more layers of a dielectric material, for example, silicon oxynitride (SiON) or silicon dioxide ($SiO_2$). In some implementations, the support layer 14b can be a stack of layers, such as, for example, a $SiO_2$/SiON/$SiO_2$ tri-layer stack. Either or both of the reflective sub-layer 14a and the conductive layer 14c can include, e.g., an aluminum (Al) alloy with about 0.5% copper (Cu), or another reflective metallic material. Employing conductive layers 14a, 14c above and below the dielectric support layer 14b can balance stresses and provide enhanced conduction. In some implementations, the reflective sub-layer 14a and the conductive layer 14c can be formed of different materials for a variety of design purposes, such as achieving specific stress profiles within the movable reflective layer 14.

As illustrated in FIG. 6D, some implementations also can include a black mask structure 23. The black mask structure 23 can be formed in optically inactive regions (e.g., between pixels or under posts 18) to absorb ambient or stray light. The black mask structure 23 also can improve the optical properties of a display device by inhibiting light from being reflected from or transmitted through inactive portions of the display, thereby increasing the contrast ratio. Additionally, the black mask structure 23 can be conductive and be configured to function as an electrical bussing layer. In some implementations, the row electrodes can be connected to the black mask structure 23 to reduce the resistance of the connected row electrode. The black mask structure 23 can be formed using a variety of methods, including deposition and patterning techniques. The black mask structure 23 can include one or more layers. For example, in some implementations, the black mask structure 23 includes a molybdenum-chromium (MoCr) layer that serves as an optical absorber, an $SiO_2$ layer, and an aluminum alloy that serves as a reflector and a bussing layer, with a thickness in the range of about 30-80 Å, 500-1000 Å, and 500-6000 Å, respectively. The one or more layers can be patterned using a variety of techniques, including photolithography and dry etching, including, for example, carbon tetrafluoromethane ($CF_4$) and/or oxygen ($O_2$) for the MoCr and $SiO_2$ layers and chlorine ($Cl_2$) and/or boron trichloride ($BCl_3$) for the aluminum alloy layer. In some implementations, the black mask 23 can be an etalon or interferometric stack structure. In such interferometric stack black mask structures 23, the conductive absorbers can be used to transmit or bus signals between lower, stationary electrodes in the optical stack 16 of each row or column. In some implementations, a spacer layer 35 can serve to generally electrically isolate the absorber layer 16a from the conductive layers in the black mask 23.

Figure 6E:
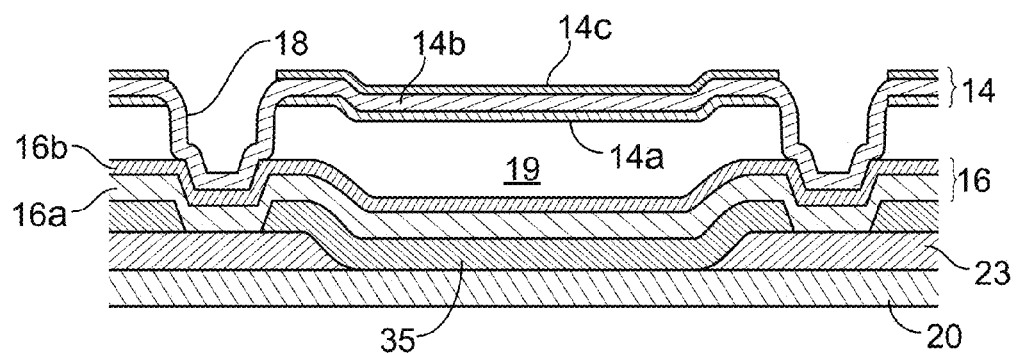

FIG. 6E shows another example of an IMOD, where the movable reflective layer 14 is self-supporting. In contrast with FIG. 6D, the implementation of FIG. 6E does not include support posts 18. Instead, the movable reflective layer 14 contacts the underlying optical stack 16 at multiple locations, and the curvature of the movable reflective layer 14 provides sufficient support that the movable reflective layer 14 returns to the unactuated position of FIG. 6E when the voltage across the interferometric modulator is insufficient to cause actuation. The optical stack 16, which may contain a plurality of several different layers, is shown here for clarity including an optical absorber 16a, and a dielectric 16b. In some implementations, the optical absorber 16a may serve both as a fixed electrode and as a partially reflective layer.

In implementations such as those shown in FIGS. 6A-6E, the IMODs function as direct-view devices, in which images are viewed from the front side of the transparent substrate 20, i.e., the side opposite to that upon which the modulator is arranged. In these implementations, the back portions of the device (that is, any portion of the display device behind the movable reflective layer 14, including, for example, the deformable layer 34 illustrated in FIG. 6C) can be configured and operated upon without impacting or negatively affecting the image quality of the display device, because the reflective layer 14 optically shields those portions of the device. For example, in some implementations a bus structure (not illustrated) can be included behind the movable reflective layer 14 which provides the ability to separate the optical properties of the modulator from the electromechanical properties of the modulator, such as voltage addressing and the movements that result from such addressing. Additionally, the implementations of FIGS. 6A-6E can simplify processing, such as, e.g., patterning.

Figure 7:
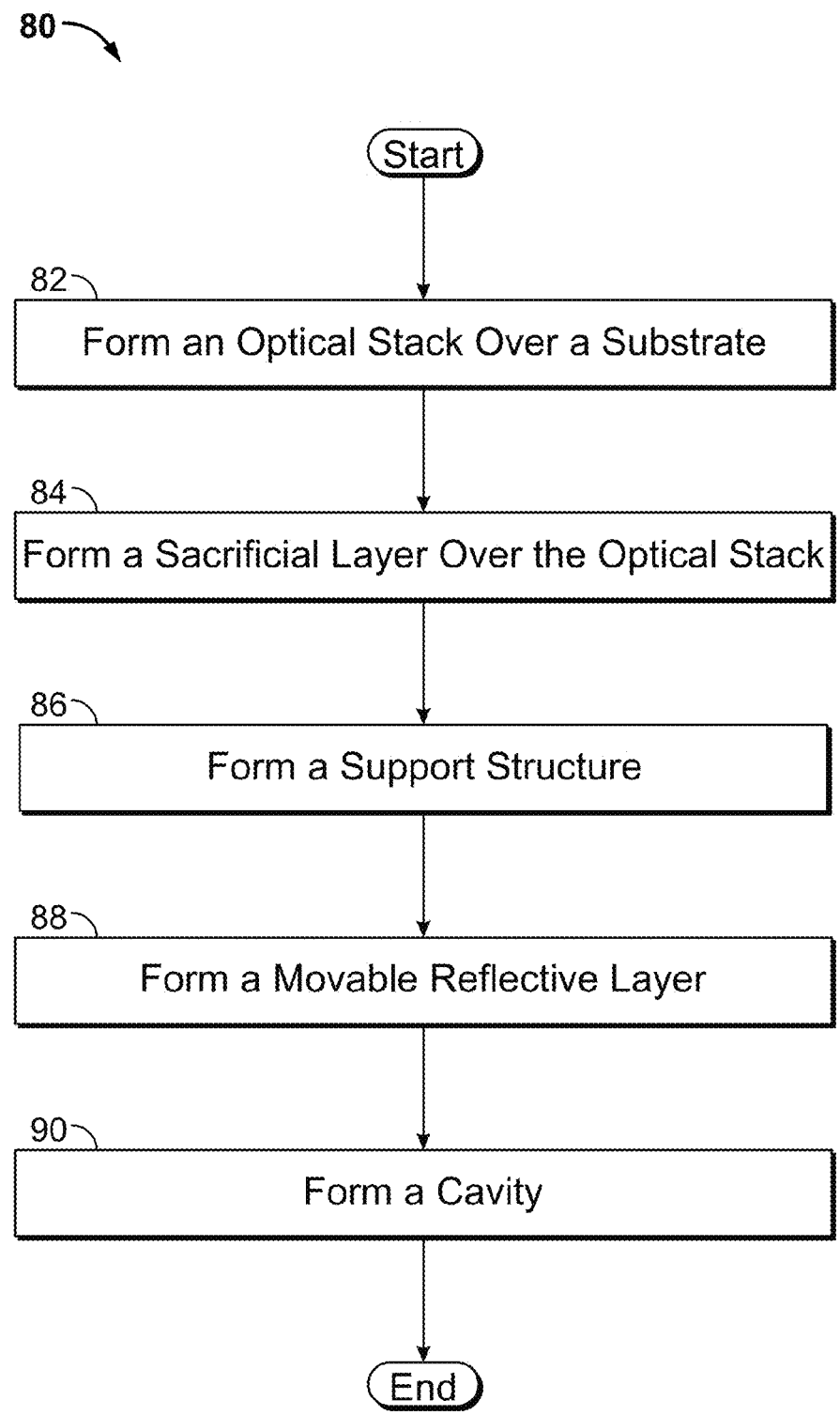
FIG. 7 shows an example of a flow diagram illustrating a manufacturing process for an interferometric modulator.
Figure 8A:
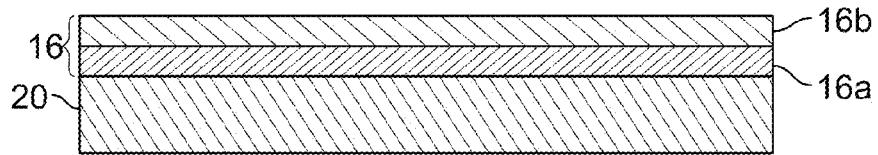
FIGS. 8A-8E show examples of cross-sectional schematic illustrations of various stages in a method of making an interferometric modulator.

FIG. 7 shows an example of a flow diagram illustrating a manufacturing process 80 for an interferometric modulator, and FIGS. 8A-8E show examples of cross-sectional schematic illustrations of corresponding stages of such a manufacturing process 80. In some implementations, the manufacturing process 80 can be implemented to manufacture, e.g., interferometric modulators of the general type illustrated in FIGS. 1 and 6, in addition to other blocks not shown in FIG. 7. With reference to FIGS. 1, 6 and 7, the process 80 begins at block 82 with the formation of the optical stack 16 over the substrate 20. FIG. 8A illustrates such an optical stack 16 formed over the substrate 20. The substrate 20 may be a transparent substrate such as glass or plastic, it may be flexible or relatively stiff and unbending, and may have been subjected to prior preparation processes, e.g., cleaning, to facilitate efficient formation of the optical stack 16. As discussed above, the optical stack 16 can be electrically conductive, partially transparent and partially reflective and may be fabricated, for example, by depositing one or more layers having the desired properties onto the transparent substrate 20. In FIG. 8A, the optical stack 16 includes a multilayer structure having sub-layers 16a and 16b, although more or fewer sub-layers may be included in some other implementations. In some implementations, one of the sub-layers 16a, 16b can be configured with both optically absorptive and conductive properties, such as the combined conductor/absorber sub-layer 16a. Additionally, one or more of the sub-layers 16a, 16b can be patterned into parallel strips, and may form row electrodes in a display device. Such patterning can be performed by a masking and etching process or another suitable process known in the art. In some implementations, one of the sub-layers 16a, 16b can be an insulating or dielectric layer, such as sub-layer 16b that is deposited over one or more metal layers (e.g., one or more reflective and/or conductive layers). In addition, the optical stack 16 can be patterned into individual and parallel strips that form the rows of the display.

Figure 8B:
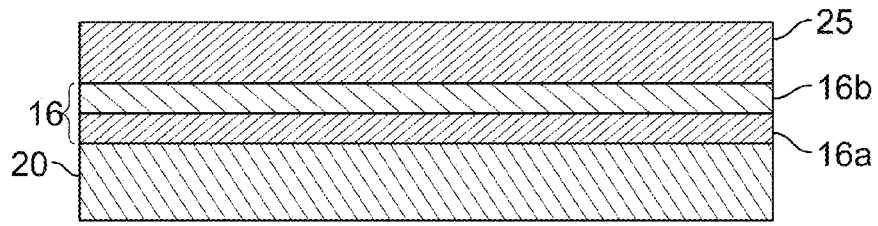

The process 80 continues at block 84 with the formation of a sacrificial layer 25 over the optical stack 16. The sacrificial layer 25 is later removed (e.g., at block 90) to form the cavity 19 and thus the sacrificial layer 25 is not shown in the resulting interferometric modulators 12 illustrated in FIG. 1. FIG. 8B illustrates a partially fabricated device including a sacrificial layer 25 formed over the optical stack 16. The formation of the sacrificial layer 25 over the optical stack 16 may include deposition of a xenon difluoride ($XeF_2$)-etchable material such as molybdenum (Mo) or amorphous silicon (Si), in a thickness selected to provide, after subsequent removal, a gap or cavity 19 (see also FIGS. 1 and 8E) having a desired design size. Deposition of the sacrificial material may be carried out using deposition techniques such as physical vapor deposition (PVD, e.g., sputtering), plasma-enhanced chemical vapor deposition (PECVD), thermal chemical vapor deposition (thermal CVD), or spin-coating.

Figure 8C:
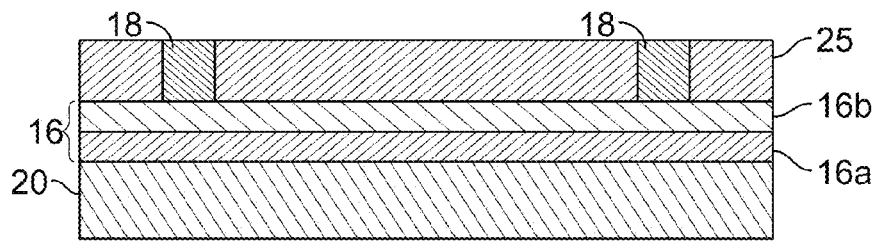

The process 80 continues at block 86 with the formation of a support structure e.g., a post 18 as illustrated in FIGS. 1, 6 and 8C. The formation of the post 18 may include patterning the sacrificial layer 25 to form a support structure aperture, then depositing a material (e.g., a polymer or an inorganic material, e.g., silicon oxide) into the aperture to form the post 18, using a deposition method such as PVD, PECVD, thermal CVD, or spin-coating. In some implementations, the support structure aperture formed in the sacrificial layer can extend through both the sacrificial layer 25 and the optical stack 16 to the underlying substrate 20, so that the lower end of the post 18 contacts the substrate 20 as illustrated in FIG. 6A. Alternatively, as depicted in FIG. 8C, the aperture formed in the sacrificial layer 25 can extend through the sacrificial layer 25, but not through the optical stack 16. For example, FIG. 8E illustrates the lower ends of the support posts 18 in contact with an upper surface of the optical stack 16. The post 18, or other support structures, may be formed by depositing a layer of support structure material over the sacrificial layer 25 and patterning to remove portions of the support structure material located away from apertures in the sacrificial layer 25. The support structures may be located within the apertures, as illustrated in FIG. 8C, but also can, at least partially, extend over a portion of the sacrificial layer 25. As noted above, the patterning of the sacrificial layer 25 and/or the support posts 18 can be performed by a patterning and etching process, but also may be performed by alternative etching methods.

Figure 8D:
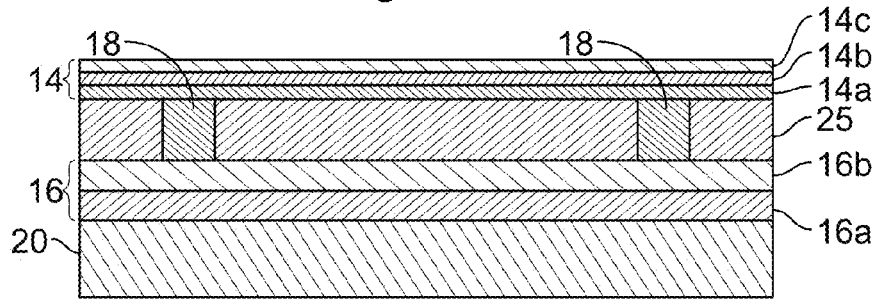
Figure 8E:
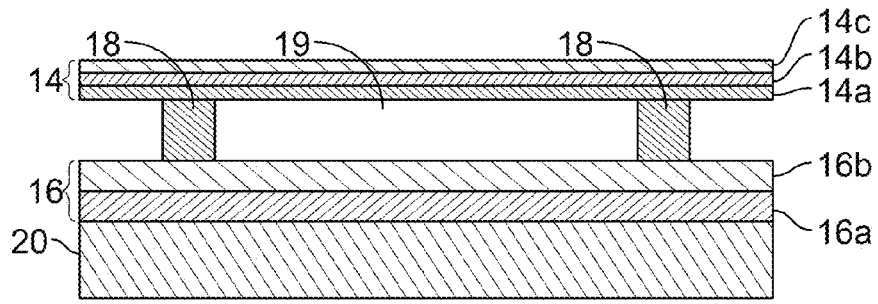

The process 80 continues at block 88 with the formation of a movable reflective layer or membrane such as the movable reflective layer 14 illustrated in FIGS. 1, 6 and 8D. The movable reflective layer 14 may be formed by employing one or more deposition processes, e.g., reflective layer (e.g., aluminum, aluminum alloy) deposition, along with one or more patterning, masking, and/or etching processes. The movable reflective layer 14 can be electrically conductive, and referred to as an electrically conductive layer. In some implementations, the movable reflective layer 14 may include a plurality of sub-layers 14a, 14b, 14c as shown in FIG. 8D. In some implementations, one or more of the sub-layers, such as sub-layers 14a, 14c, may include highly reflective sub-layers selected for their optical properties, and another sub-layer 14b may include a mechanical sub-layer selected for its mechanical properties. Since the sacrificial layer 25 is still present in the partially fabricated interferometric modulator formed at block 88, the movable reflective layer 14 is typically not movable at this stage. A partially fabricated IMOD that contains a sacrificial layer 25 also may be referred to herein as an "unreleased" IMOD. As described above in connection with FIG. 1, the movable reflective layer 14 can be patterned into individual and parallel strips that form the columns of the display.

The process 80 continues at block 90 with the formation of a cavity, e.g., cavity 19 as illustrated in FIGS. 1, 6 and 8E. The cavity 19 may be formed by exposing the sacrificial material 25 (deposited at block 84) to an etchant. For example, an etchable sacrificial material such as Mo or amorphous Si may be removed by dry chemical etching, e.g., by exposing the sacrificial layer 25 to a gaseous or vaporous etchant, such as vapors derived from solid $XeF_2$ for a period of time that is effective to remove the desired amount of material, typically selectively removed relative to the structures surrounding the cavity 19. Other combinations of etchable sacrificial material and etching methods, e.g. wet etching and/or plasma etching, also may be used. Since the sacrificial layer 25 is removed during block 90, the movable reflective layer 14 is typically movable after this stage. After removal of the sacrificial material 25, the resulting fully or partially fabricated IMOD may be referred to herein as a "released" IMOD.

As described herein, the interferometric modulators may function as reflective display elements and in some implementations may use ambient lighting or internal illumination for their operation. For example, in low ambient lighting conditions, an illumination system may be used to illuminate a display to produce an image with interferometric modulators or other display elements. In some implementations, a light source can direct light into a light guide disposed forward of the display elements, from which light may thereafter be redirected to the display elements. However, it will be understood that the reflective display elements are not limited to interferometric modulators, but can include other reflective display elements.

Figure 9A:
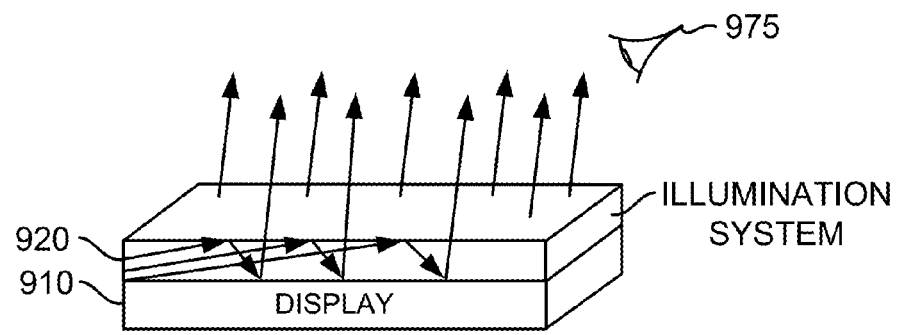
FIG. 9A is an example of a schematic illustration of a display illuminated by an illumination system.

FIG. 9A is an example of a schematic illustration of a display illuminated by an illumination system. A reflective display, such as an interferometric modulator display or other reflective display, may use an illumination system 920 to illuminate a display 910. Other examples of reflective displays can include reflective liquid crystal displays, electrowetting displays, electrophoretic displays, and electrochromic displays. The use of the illumination system 920 may be desirable when ambient light is not sufficient to fully illuminate a display 910. In some implementations, the illumination system 920 may include a front light with light-turning features (not shown) to extract light within a light guide towards the display 910, and allowing the extracted light to reflect off of the display 910 to provide an image for a viewer 975. Light may be injected into the light guide by a light source, such as one or more light emitting diodes (LEDs). In some implementations, an LED may be coupled into an edge bar which may then spread the light along a width of the light guide to be guided within the light guide and then extracted towards the display 910.

Figure 9B:
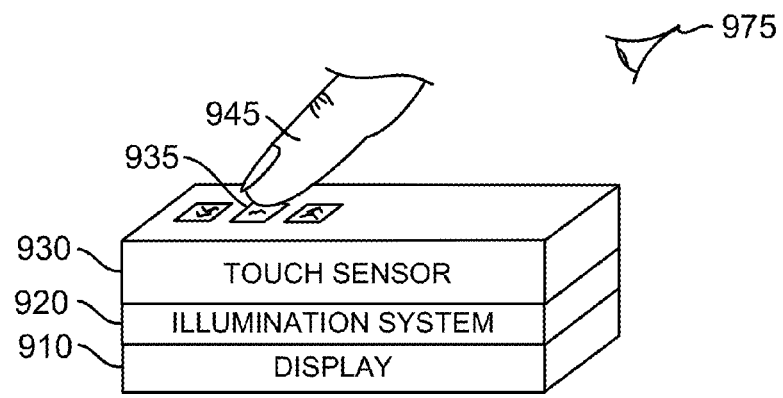
FIG. 9B is an example of a schematic illustration of a display with an illumination system and a touch sensor.

In some implementations, it may be desirable to include touch sensor capability for a display device. FIG. 9B is an example of a schematic illustration of a display with an illumination system and a touch sensor. As shown in the example in FIG. 9B, a display 910 can be illuminated with an illumination system 920. Disposed over the illumination system 920 is a touch sensor 930. The touch sensor 930 can be configured to determine the location of a touch by sensing a change to the capacitance of a conductor or conductors formed in the touch sensor 930. For example, the change to the capacitance can be induced by the proximity of a human finger 945. The use of the touch sensor 930 allows for the useful interaction of a user's finger 945 with the display device. For example, by touching the screen in different locations, the user may use his or her fingers 945 to select certain icons 935 displayed on the display 910 (icons 935 are shown on touch sensor 930 for illustrative purposes; the icons 935 are formed in or on the display 910 and are viewed through the illumination system 920 and the touch sensor 930). The touch sensor 930 and the illumination system 920 can be stacked on top of one another. In some implementations as illustrated by the example in FIG. 9B, the touch sensor 930 can be closer to the user viewing the display 910 than the illumination system 920.

Figure 9C:
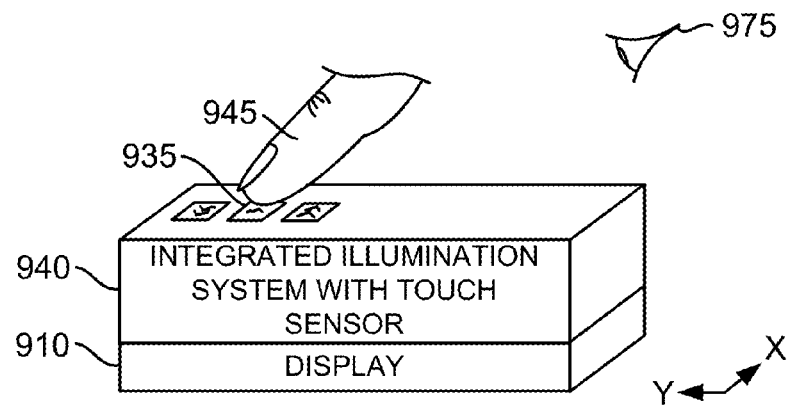
FIG. 9C is an example of a schematic illustration of a display with an integrated illumination system and touch sensor.

In some implementations, the touch sensor is integrated with the illumination system. FIG. 9C is an example of a schematic illustration of a display with an integrated illumination system and touch sensor. The integrated illumination system and touch sensor 940 provides both illumination to the display 910 and touch sensing capability. In some implementations, one or more components of the integrated illumination system and touch sensor 940 simultaneously have illumination as well as touch sensing functions. For example, electrodes formed in the integrated illumination system and touch sensor 940 may provide both illumination and touch sensing capabilities. As illustrated, integrated illumination system and touch sensor 940 can include a single unit or layer. However, it is understood that the integrated illumination system and touch sensor 940 can include multiple layers and/or components.

Figure 10A:
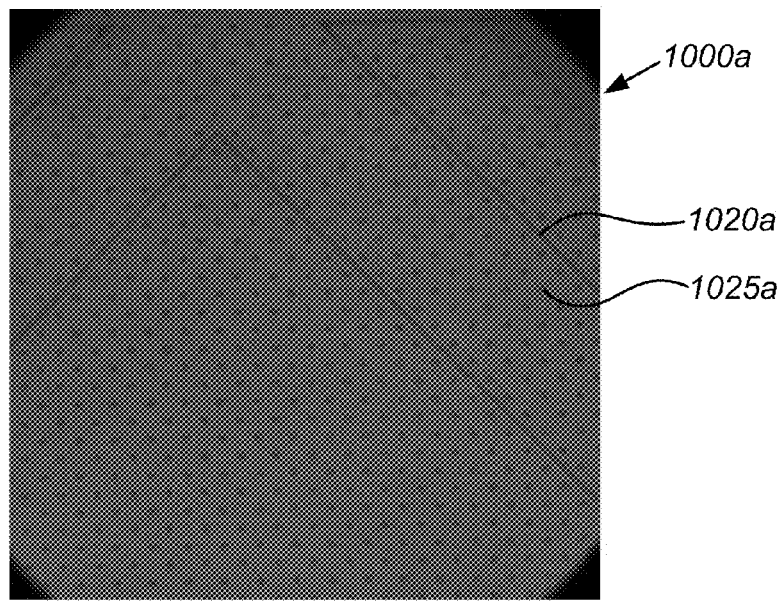
FIG. 10A shows an image of a display with an array of light-turning features and touch sensor wires between some of the light-turning features.

Illumination systems such as front lights may use a light guide to distribute light from a light source across an active area. A surface of the light guide may include a reflective structure that at least partially reflects incident light. The reflective structure can include light-turning features, such as facets, and/or conductive wires, such as touch sensor wires. FIG. 10A shows an image of a display with an array of light-turning features and touch sensor wires between some of the light-turning features. In the image in FIG. 10A, a display 1000a shows an array of light-turning features 1025a represented by dots, which can be spaced apart between about 25 μm and about 100 μm, such as about 35 μm. Each of the light-turning features 1025a can have a diameter between about 1 μm and about 15 μm, such as about 10 μm. The display 1000a can also have a conductive wire 1020a spanning between some of the light-turning features 1025a. The conductive wire 1020a can have a diameter between about 0.5 μm and about 10 μm, such as about 5 μm.

Figure 10B:
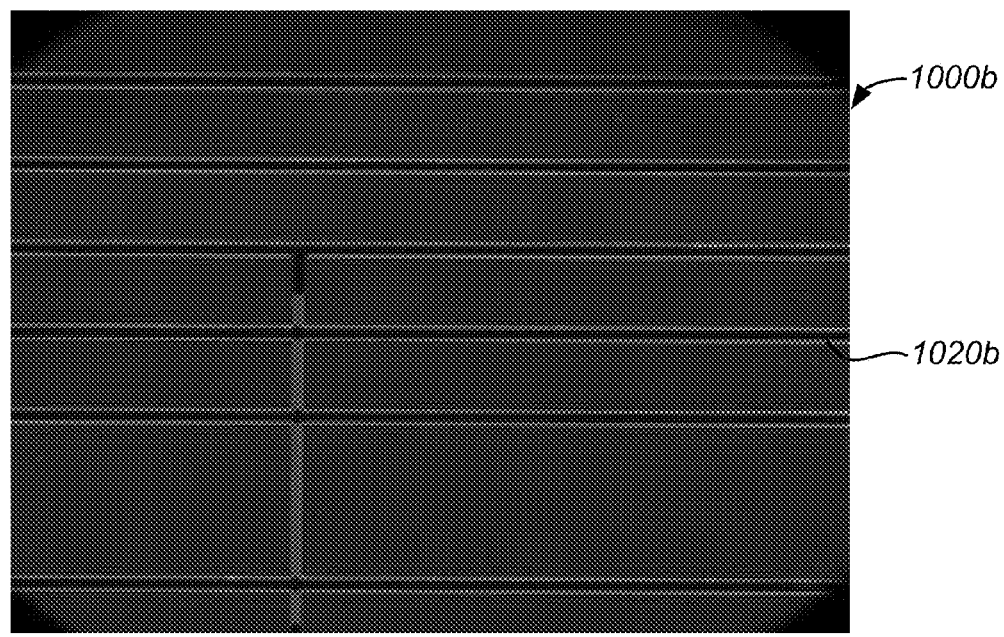
FIG. 10B shows an image of a display with an array of touch sensor wires showing light scattering effects along the edges of the touch sensor wires.

However, some of the light propagating within the light guide can strike the edges of the reflective structure, causing the light to scatter or diffract. This can cause visual artifacts and undesirable leakage of light from the light guide, which can reduce the contrast ratio. FIG. 10B shows an image of a display with an array of touch sensor wires showing light scattering effects along the edges of the touch sensor wires. In the image in FIG. 10B, a display 1000b includes touch sensor wires 1020b, with leakage of light occurring along the edges of the touch sensor wires 1020b.

Figure 11:
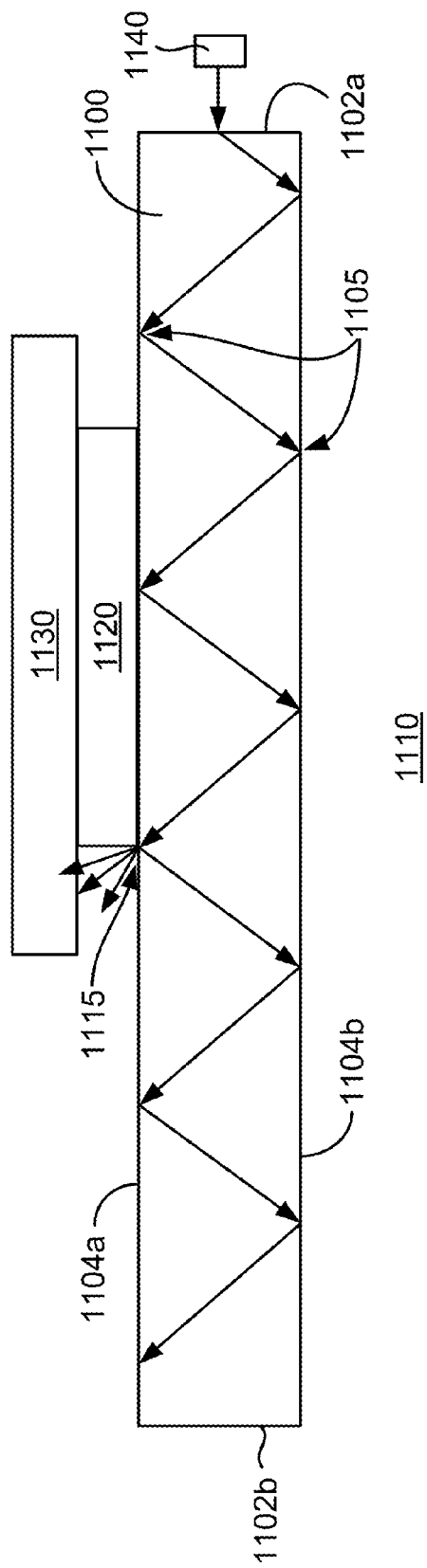
FIG. 11 is an example of a side cross-sectional schematic illustration of an illumination system with a light guide having an absorber structure with an overhanging portion over a reflective structure.

FIG. 11 is an example of a side cross-sectional schematic illustration of an illumination system with a light guide having an absorber structure over a reflective structure. As light 1105 enters the light guide 1100, light 1105 can propagate through the light guide 1100 and reflect off the surfaces of the light guide 1100. This can occur by, for example, total internal reflection, reflection off a discontinuity, or reflection off any surface in the light guide 1100. The light guide 1100 can be formed of one or more optically transmissive materials and have an index of refraction that is greater than an index of refraction of a surrounding medium 1110.

Examples of optically transmissive materials for a light guide 1100 can include the following: acrylics, acrylate copolymers, UV-curable resins, polycarbonates, cycloolefin polymers, silicates, alumina, sapphire, polyethylene terephthalate (PET), polyethylene terephthalate glycol (PET-G), silicon oxynitride, and/or other optically transmissive materials. The optically transmissive material can have an index of refraction between about 1.40 and about 2.40. In some implementations, the optically transmissive material is glass, which can have an index of refraction of about 1.52.

The surrounding medium 1110 can have an index of refraction less than an index of refraction of the light guide 1100. This allows light 1105 to propagate at shallow angles within the light guide 1100 by total internal reflection, so that light 1105 does not escape at shallow angles into the surrounding medium 1110. The surrounding medium 1110 can include any number of materials with a suitable index of refraction, such as transparent polymer, air, etc.

A light source 1140 can be configured to inject light 1105 into the light guide 1100. The light source 1140 can be a light emitting device such as, but not limited to, an LED, an incandescent light bulb, a laser, a fluorescent tube, or any other form of a light emitter. In some implementations, a point light source can be coupled into an edge bar which may then spread the light along a width of the light guide 1100.

With continued reference to FIG. 11, the light guide 1100 can have a light input edge 1102a and an opposite edge 1102b. The light guide 1100 can also have transverse edges 1104a and 1104b that are transverse to the edges 1102a and 1102b. The light source 1140 can be configured to inject light 1105 through the light input edge 1102a. A reflective structure 1120 can be disposed over one of the transverse edges 1104a and 1104b. In some implementations, the transverse edges 1104a and 1104b can be formed by a process that results in smooth surfaces.

In the example illustrated in FIG. 11, a reflective structure 1120 is formed over a portion of one of the transverse edges 1104a and 1104b, such as transverse edge 1104a. The reflective structure 1120 can be formed by a deposition or patterning process, laminated, or bonded onto transverse edge 1104a, as described in greater detail below. The reflective structure 1120 can include a light-turning feature and/or a conductive wire. In some implementations, the reflective structure 1120 can be substantially non-transparent and can at least partially reflect incident light 1105 in the light guide 1100. In some implementations, the reflective structure 1120 can be metalized.

The reflective structure 1120 can have different materials and sizes to optimize performance. The reflective structure 1120 may include, for example, a metal layer such as aluminum (Al), nickel (Ni), silver (Ag), molybdenum (Mo), gold (Au), and chromium (Cr). In some implementations, the reflective structure 1120 can be between about 10 nm and about 100 nm thick. For example, the reflective structure 1120 can be about 30 nm thick. The reflective structure 1120 can also be about 0.5 μm and about 10 μm wide. In some implementations as a light-turning feature, the reflective structure 1120 can be about 10 μm wide. In some implementations as a conductive wire, the reflective structure 1120 can be about 3 μm wide.

In FIG. 11, the illumination system can further include an absorber structure 1130 over the reflective structure 1120. In some implementations, the absorber structure 1130 can include one or more layers that cause destructive interference for wavelengths of light within the visible range and/or constructive interference for wavelengths of light outside of the visible range. For example, the absorber structure can include a black mask structure, such as a $SiO_2/MoCr/SiO_2$ tri-layer stack. In other words, the absorber structure 1130 can partially absorb light 1105 from the light guide 1100, such that the reflected light causes the spectrum to shift over from the visible spectrum to the non-visible spectrum, such as causing constructive interference for wavelengths of light in the ultraviolet wavelength range. As such, this would create an appearance of black or at least have a reduced level of visible light. Thus, the use of the absorber structure 1130 can increase the contrast ratio of a display. As a result, the absorber structure 1130 enables the reflective structure 1120 to appear dark (e.g., black) from the top and reflective (e.g., mirror-like) from the bottom.

In some implementations, a width of the absorber structure 1130 can be greater than a width of the reflective structure 1120. As illustrated in the example in FIG. 11, light 1105 interacting with one or more edges of the reflective structure 1120 can scatter or diffract and escape the light guide 1100, which can lead to visual artifacts and reduce the contrast ratio of a display. Hence, as light 1115 scatters or diffracts from the one or more edges of the reflective structure 1120, the absorber structure 1130 can absorb and interferometrically cancel the scattered light 1115.

In some implementations, the size and materials of the absorber structure 1130 can be configured to control the relative amounts of reflectance and transmittance of scattered light 1115. The absorber structure 1130 can be an interferometric stack with multiple thin film layers. The interferometric stack can include at least a substantially non-transparent layer. The substantially non-transparent layer can include various materials, for example, Cr, Mo, Si, titanium (Ti), tantalum (Ta), tungsten (W), and alloys thereof, such as MoCr. In some implementations, the absorber structure 1130 can be between about 10 nm and about 250 nm thick. For example, the absorber structure 1130 can be about 100 nm thick. The absorber structure 1130 is wider than the reflective structure 1120, and can be between about 1 μm and about 12 μm wide. In some implementations, the width of the absorber structure 1130 can laterally extend past each of the edges of the reflective structure 1120 by a distance between about 100 nm and about 1000 nm. In some implementations, the width of the absorber structure 1130 can laterally extend past each of the edges of the reflective structure 1120 by a distance of greater than or equal to the wavelength of visible light (e.g., between about 400 nm and about 700 nm) to substantially cancel the scattered light 1115.

Figure 12A:
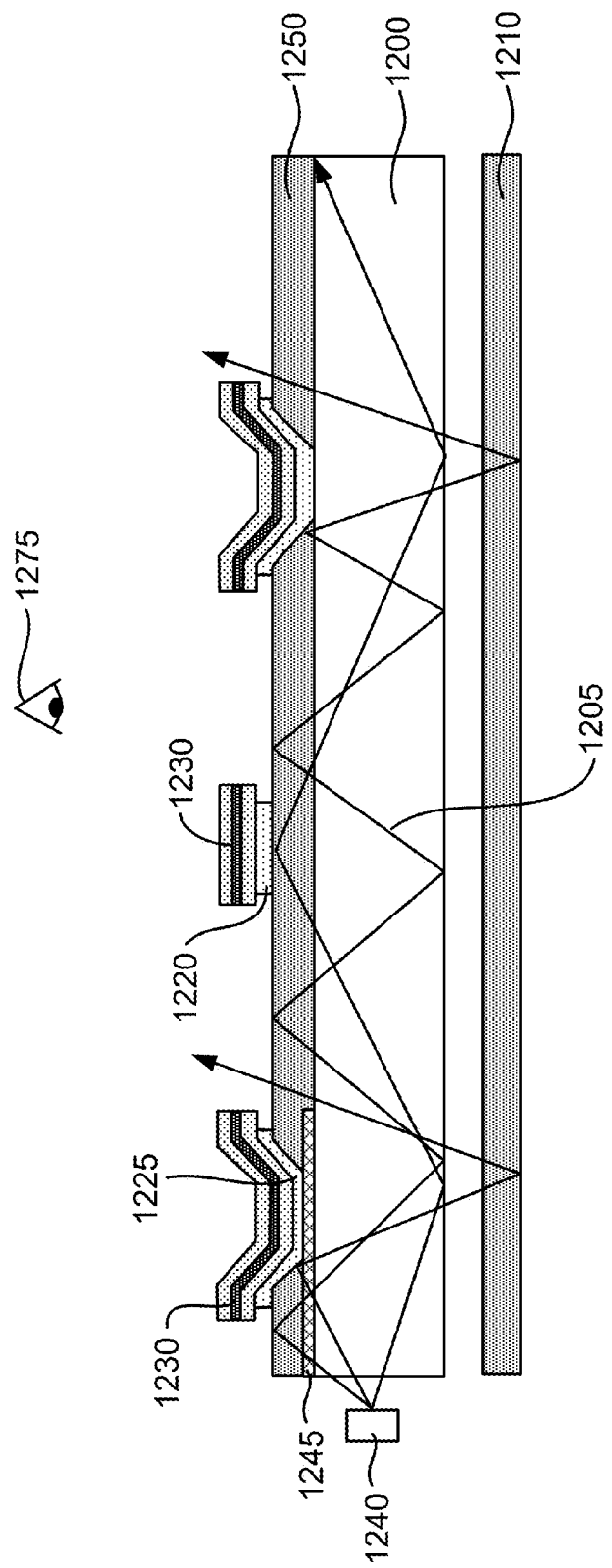
FIG. 12A is an example of a side cross-sectional schematic illustration of a display system incorporating an illumination system with absorber structures having overhanging portions.

FIG. 12A is an example of a side cross-sectional schematic illustration of a display system incorporating an illumination system with absorber structures having overhanging portions. The display system can include a light guide 1200 configured to receive light 1205 from a light source 1240. The light guide 1200 can include a plurality of light-turning features 1225 that are configured to direct light to a display 1210. As light 1205 propagates within the light guide 1200 through total internal reflection, the light 1205 may strike light-turning features 1225. The light 1205 may turn at a steep angle toward the display 1210, allowing the light 1205 to break from reflection and illuminate a display 1210. Light 1205 that illuminates the display 1210 can reflect out to provide an image that can be seen by a viewer 1275. Light 1205 that does not at first reflect off one of the light-turning features 1225 may continue to propagate through the light guide 1200 and subsequently reflect off another one of the light-turning features 1225.

The plurality of light-turning features 1225 can include, but is not limited to facets, refractive features, diffractive features, diffusive features, printed dots, holograms, holographic features and combinations thereof. In the example in FIG. 12A, the light-turning features 1225 are facets. The material, size, shape, pattern, and quantity of the light-turning features 1225 can vary. The quantity and pattern of the light-turning features 1225 can affect the illumination efficiency of the display system, which compares the amount of light 1205 provided by the light source 1240 with the amount of light reflected from the display 1210. In some implementations, the light-turning features can occupy between about 2% and 10% of a total surface area of a light guide 1200. As discussed earlier with respect to the example in FIG. 10A, the light-turning features can be represented by dots, which can be spaced apart by between about 25 μm and 100 μm, such as about 35 μm. In some implementations, the pattern of the light-turning features 1225 can be uniformly spaced apart. Each light-turning feature 1225 can have substantially the same size and shape. As illustrated in the example in FIG. 12A, the light-turning feature 1225 can have a cross-section that is frusto-conical in shape. Light-turning features 1225 can have other cross-sectional shapes, such as polygonal, curvilinear, irregular, generally polygonal, generally curvilinear, square, triangular, rectangular, circular, and round. In some implementations, the width of the light-turning features 1225 can be between about 1 μm and about 15 μm, such as about 10 μm. In some implementations, the depth of the light-turning features 1225 can be between about 0.5 μm and about 5 μm, such as about 1.5 μm. The light-turning features 1225 can include a reflective material, such as a metallic material. The reflective material can include, but is not limited to Al, Ni, Ag, Mo, Au, and Cr.

In some implementations, the display system can further include a transparent layer 1250 over the light guide 1200. In some implementations, the light-turning features 1225 can be disposed on a top surface of the light guide 1200 and within the transparent layer 1250. In some implementations, the transparent layer 1250 can be made of the same material as the light guide 1200, and in some implementations, the transparent layer 1250 can be made of different materials than the light guide 1200. The transparent layer 1250 can have substantially the same or substantially similar index of refraction as the light guide 1200. Accordingly, light 1205 may propagate successively through the two layers without being substantially reflected or refracted at an interface between the two layers. In certain implementations, the transparent layer 1250 can be made of SiON with an index of refraction of about 1.52, and the light guide 1200 can be made of $SiO_2$ with an index of refraction of about 1.52. The light guide 1200 and the transparent layer 1250 can be held together by an adhesive, which can include a refractive index-matched pressure-sensitive adhesive with the light guide 1200 and the transparent layer 1250. The light guide 1200 can have a thickness between about 300 μm and about 1000 μm and the transparent layer 1250 can have a thickness between 0.5 μm and 5 μm.

As discussed earlier herein, light 1205 can turn from light-turning features 1225 toward the display 1210 to illuminate the display 1210 so as to provide an image that can be seen by the viewer 1275. The display 1210 can be a reflective display 1210 with a plurality of reflective display elements (not shown). For example, the reflective display elements can include IMODs, EMS devices, MEMS devices, NEMS devices, reflective spatial light modulators, and/or any other suitable reflective display elements. Such other reflective display elements can include reflective liquid crystal displays, electrowetting displays, electrophoretic displays, and electrochromic displays. The reflective display elements may be configured in an array. In some implementations, the display 1210 can include an active area having reflective display elements for producing an image.

As illustrated in the example in FIG. 12A, a reflective structure 1220 can be formed over a transparent layer 1250. The reflective structure 1220 can be configured to reflect light 1205 to successively propagate the light 1205 within the light guide 1200. In some implementations as discussed earlier herein, the reflective structure 1220 can be a conductive wire. The conductive wire can be made of a metal such as Al, Ni, Ag, Mo, Au, and Cr, having a width between about 0.5 μm and about 10 μm, and having a thickness between about 10 nm and about 1000 nm. In some implementations, the conductive wire can be a touch sensor wire.

The light guide 1200, the plurality of light-turning features 1225 (e.g., facets), and the reflective structure 1220 (e.g., touch sensor wire) can form an integrated touch and facet system for the display system. For example, the integrated touch and facet system can include an integrated touch and facet-in-glass system. The light guide 1200 can be part of a front light for the integrated touch and facet-in-glass system. In some implementations, the light-turning features 1225 and/or the reflective structure 1220 can perform both optical and electrical functions. In other words, the light-turning features 1225 and/or the reflective structure 1220 can be configured to redirect light 1205 to the display 1210 and also have touch sensor capability that is in electrical communication with a touch sensor system.

In the example in FIG. 12A, a conductive line 1245 can be formed between the light guide 1200 and one of the light-turning features 1225. The conductive line 1245 can serve as an electrically conductive interconnect between two or more light-turning features 1225 (e.g., facets). In some implementations of an integrated touch and facet-in-glass system, the conductive line 1245 can provide an electrically conductive interconnect with a touch sensor system. The conductive line 1245 can be made of any suitable electrically conductive material.

An absorber structure 1230 can be formed over the reflective structure 1220. Additionally, absorber structures 1230 can be formed over the light-turning features 1225. The absorber structures 1230 can be formed forward of the display 1210, such that the absorber structures 1230 are closer to an image-display side. Reflections of ambient light may occur off the reflective structure 1220 and/or the light-turning features 1225 that may degrade the image formed on the display 1210. As discussed earlier herein, the reflections of ambient light may degrade the image displayed on the display 1210 as reflected white light may whiten out the (colored) light that is reflected from the display 1210. Hence, these reflections of ambient light can lead to contrast ratio reduction. Thus, the absorber structures 1230 can reduce or eliminate the reflections that would otherwise reduce the contrast ratio.

Figure 12B:
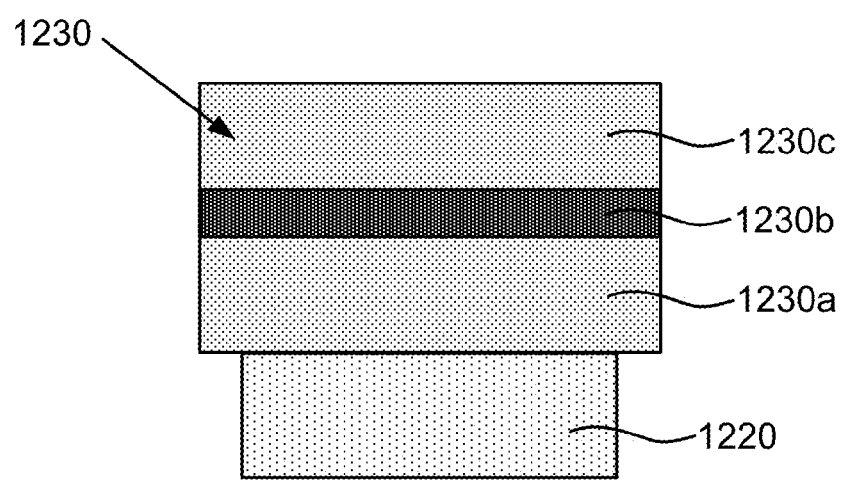
FIG. 12B is the reflective structure with the absorber structure having overhanging portions in FIG. 12A.

FIG. 12B is the reflective structure with the absorber structure having overhanging portions in FIG. 12A. The absorber structure 1230 can have overhanging portions that are substantially parallel with and laterally protruding past one or more edges of the reflective structure 1220. The overhanging portions can serve as ledges that further reduce or eliminate reflections due to scattered light from the edges of the reflective structure 1220. As illustrated in the example in FIG. 12B, the absorber structure 1230 can include multiple layers 1230a, 1230b, and 1230c to form a thin film interferometric stack, such as a black mask structure.

The absorber structure 1230 can include an absorber layer 1230b sandwiched between two optical layers 1230a and 1230c. The optical layers 1230a and 1230c can include materials such as $SiO_2$, $Al_2O_3$, $TiO_2$, ITO, $Si_3N_4$, $Cr_2O_3$, ZnO, or mixtures thereof. The thickness of the optical layers 1230a and 1230c can be configured to shift the spectrum of reflected light from the visible to the non-visible spectrum (e.g., causing constructive interference for wavelengths of light in the ultraviolet wavelength range). For example, a suitable thickness for at least one the optical layer 1230a can be between about 300 nm and about 100 nm. In some implementations, the optical layer 1230c can be symmetrically identical in material and thickness with the optical layer 1230a. The absorber layer 1230b can include semi-transparent thicknesses of metallic or semiconductor layers. The absorber layer 1230b can include Cr, Mo, Si, Ti, Ta, W, and alloys thereof, such as MoCr. The absorber layer 1230b can be between about 2 nm and about 30 nm.

Figure 13A:
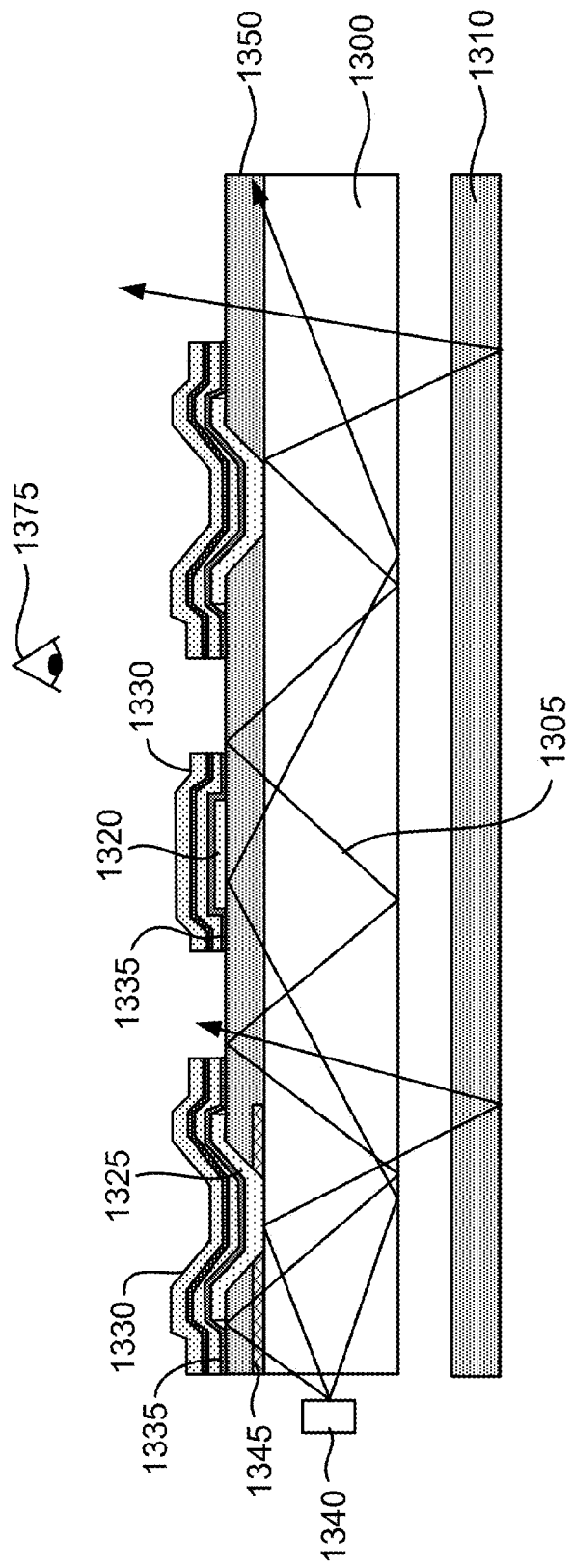
FIG. 13A is an example of a side cross-sectional schematic illustration of a display system incorporating an illumination system with absorber structures having enclosing portions.

FIG. 13A is an example of a side cross-sectional schematic illustration of a display system incorporating an illumination system with absorber structures having enclosing portions. The display system can include a light guide 1300 configured to receive light 1305 from a light source 1340. The light guide 1300 can include a plurality of light-turning features 1325 that are configured to direct light to a display 1310, which can then provide an image for a viewer 1375. In some implementations, the display system can further include a transparent layer 1350. The display system can also include a reflective structure 1320 formed on the transparent layer 1350. In some implementations, the reflective structure 1320 can be a conductive wire, such as a touch sensor wire.

Figure 13B:
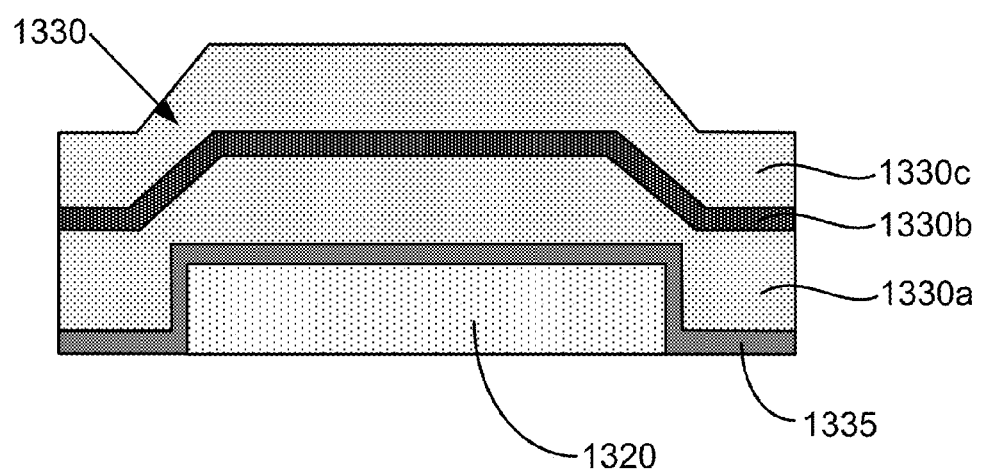
FIG. 13B is the reflective structure with the absorber structure having enclosing portions in FIG. 13A.

Absorber structures 1330 can be formed over the reflective structure 1320 and the plurality of light-turning features 1325. FIG. 13B is the reflective structure with the absorber structure having enclosing portions in FIG. 13A. The absorber structure 1330 includes enclosing portions that substantially enclose the reflective structure 1320. Additionally, the enclosing portions can laterally protrude past the one or more edges of the reflective structure 1320. The absorber structure 1330 can include multiple layers 1330*a*, 1330*b*, and 1330*c* to form a thin film interferometric stack, such as a black mask structure.

As illustrated in the example in FIG. 13A, each of the light-turning features 1325 and the reflective structure 1320 can include an etch stop layer 1335. The etch stop layer 1335 can be formed between the absorber structure 1330 and each of the light-turning features 1325 and the reflective structure 1320. The etch stop layer 1335 can extend beyond the edges of each of the light-turning features 1325 and the reflective structure 1320. In some implementations, the etch stop layer 1335 can be a thin layer of $Al_2O_3$, $SiO_2$, or silicon nitride (SiN).

In some implementations, with the addition of the etch stop layer 1335 in FIGS. 13A and 13B, the enclosing portions in FIGS. 13A and 13B can be wider than the overhanging portions in FIGS. 12A and 12B. An increased width in the enclosing portions in FIGS. 13A and 13B can darken an image by reducing the amount of light that extracts out of the light guide 1300 to the viewer 1375. However, without an etch stop layer, the overhanging portions in FIGS. 12A and 12B can lead to trapped voids in subsequently deposited layers, such as a passivation layer (not shown) over the absorber structure and the transparent layer. The presence of trapped voids can lead to possible corrosion by trapping undesirable materials in the voids. The passivation layer can be made of an optically transparent material with an index of refraction less than an index of refraction of the transparent layer 1350.

Figure 14:
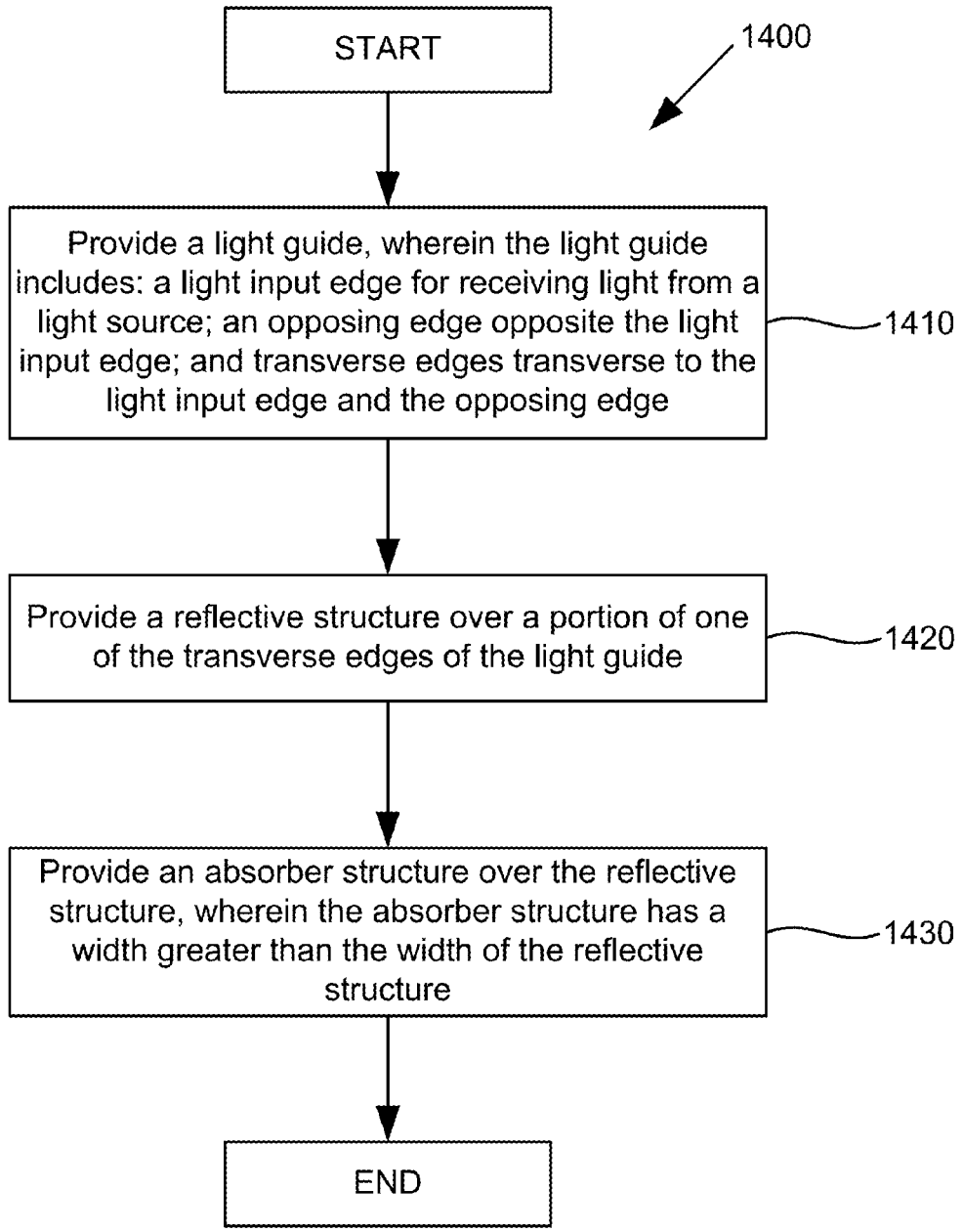
FIG. 14 is an example of a flow diagram illustrating a method of manufacturing an illumination system.

FIG. 14 is an example of a flow diagram illustrating a method of manufacturing an illumination system. It will be understood that additional processes not shown in FIG. 14 may be present.

The process 1400 begins at block 1410, where a light guide is provided. The light guide can include a light input edge for receiving light from a light source and an opposing edge opposite the light input edge. The light guide further includes transverse edges that are transverse to the light input edge and the opposing edge. The light guide can be made of an optically transmissive material, as discussed earlier herein. In some implementations, a transparent layer can be deposited over the light guide that can be index-matched with the light guide.

The process 1400 continues at block 1420, where a reflective structure is provided over a portion of one of the transverse edges of the light guide. In some implementations, the reflective structure is a metal that forms part of a light-turning feature, such as a facet. In some implementations, the reflective structure is a metal that forms part of a conductive wire, such as a touch sensor wire.

The reflective structure can be formed by depositing reflective material on a surface of one of the transverse edges of the light guide. The reflective material can include an electrically conductive material, such as a metal. The reflective material can be deposited using any appropriate deposition technique, including physical vapor deposition (PVD, e.g., sputtering), plasma-enhanced chemical vapor deposition (PECVD), chemical vapor deposition (CVD), atomic layer deposition (ALD), or spin-coating. The reflective structure can then be formed with one or more patterning, masking, and/or etching processes. In some implementations, the reflective structure can be formed using other suitable techniques, such as embossing, screen printing, laminating, or lithography. The reflective structure can form part of a light-turning feature and/or a conductive wire.

In some implementations, the light guide and/or transparent layer can include recesses, and the reflective material can be conformally deposited in the recesses. The reflective material deposited in the recesses can be subsequently patterned, masked, and/or etched to form light-turning features (e.g., facets). Light-turning features and conductive wires can be formed from a single layer of reflective material, and simultaneously formed in the same patterning step. The reflective structure can also be formed using different etching agents and techniques, for example, timed etching. In some implementations, the reflective structure can be formed by standard wet or dry etching processes. In some implementations, the reflective structure can be formed by sand blast processes. These processes may be accomplished on a light guide alone, or on a light guide with a transparent layer.

The process 1400 continues at block 1430, where an absorber structure is provided over the reflective structure. The absorber structure has a width greater than a width of the reflective structure. In some implementations, the absorber structure includes overhanging portions that are substantially in parallel with and laterally protrudes from one or more edges of the reflective structure. In some implementations, the absorber structure includes enclosing portions that substantially enclose the reflective structure.

In some implementations, the absorber structure can be formed by depositing multiple layers over the reflective structure by any suitable deposition technique. The multiple layers can be subsequently patterned, masked, and/or etched to form an interferometric stack over the reflective structure. The reflective structure can be further etched to partially undercut the absorber structure and create overhanging portions. For example, the reflective structure can be etched using an isotropic metal etch.

In some implementations, an etch stop layer can be formed between the absorber structure and the reflective structure. The etch stop layer can be deposited after forming the reflective structure using any known deposition technique. For example, the etch stop layer can be conformally deposited over the reflective structure using ALD. The absorber structure can be subsequently deposited and patterned over the etch stop layer, with the etch stop layer providing protection for the reflective structure against etchants. In some implementations, a passivation layer can be deposited over the absorber structure and the light guide.

Figure 15A:
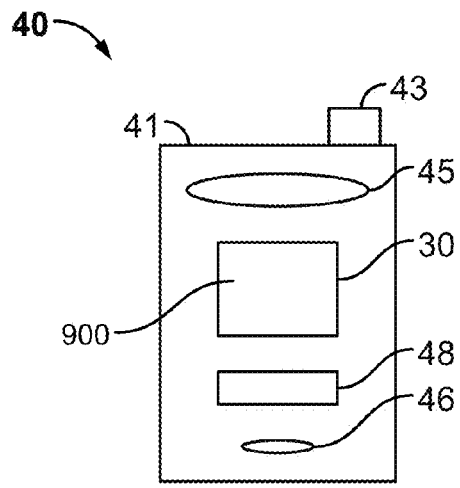
FIGS. 15A and 15B show examples of system block diagrams illustrating a display device that includes a plurality of interferometric modulators.
Figure 15B:
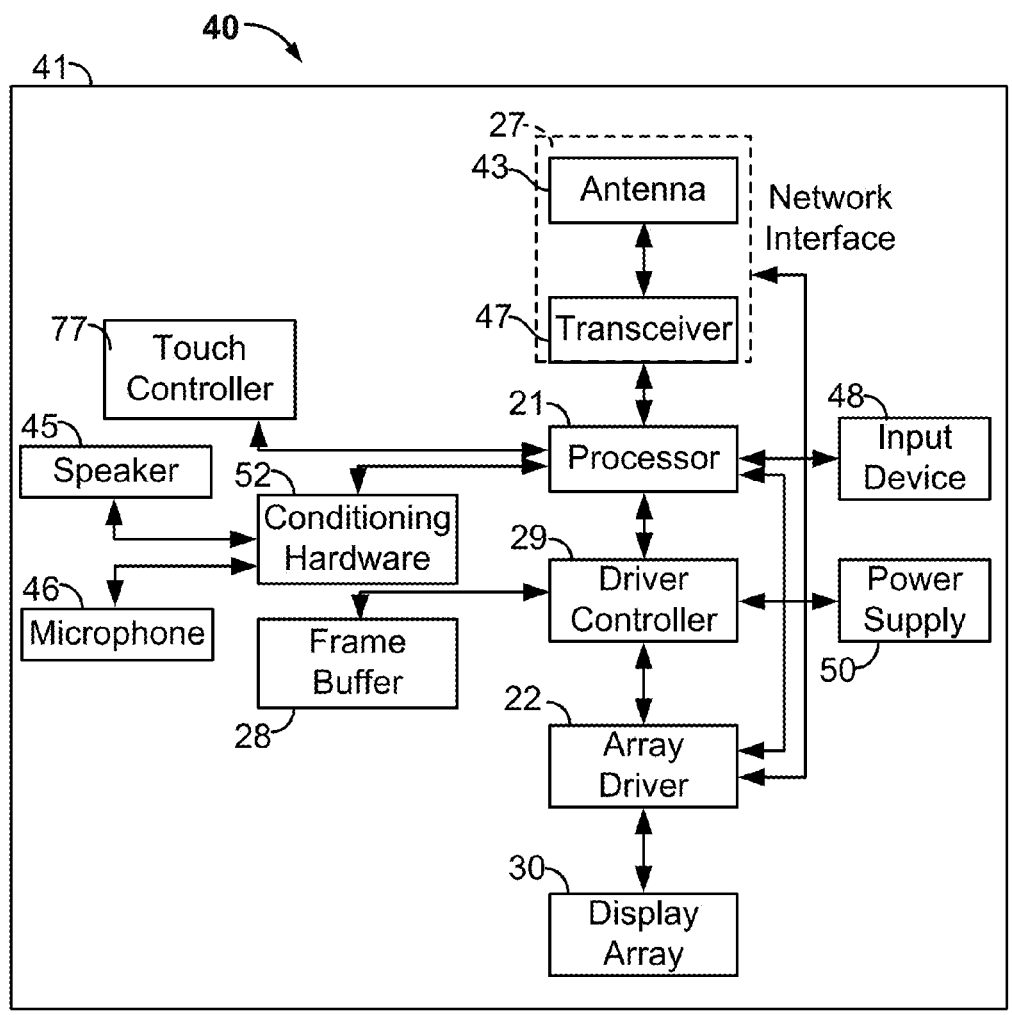

FIGS. 15A and 15B show examples of system block diagrams illustrating a display device 40 that includes a plurality of interferometric modulators. The display device 40 can be, for example, a cellular or mobile telephone. However, the same components of the display device 40 or slight variations thereof are also illustrative of various types of display devices such as televisions, e-readers and portable media players.

The display device 40 includes a housing 41, a display 30, an antenna 43, a speaker 45, an input device 48, and a microphone 46. The housing 41 can be formed from any of a variety of manufacturing processes, including injection molding, and vacuum forming. In addition, the housing 41 may be made from any of a variety of materials, including, but not limited to: plastic, metal, glass, rubber, and ceramic, or a combination thereof. The housing 41 can include removable portions (not shown) that may be interchanged with other removable portions of different color, or containing different logos, pictures, or symbols.

The display 30 may be any of a variety of displays, including a bi-stable or analog display, as described herein. The display 30 also can be configured to include a flat-panel display, such as plasma, EL, OLED, STN LCD, or TFT LCD, or a non-flat-panel display, such as a CRT or other tube device. In addition, the display 30 can include an interferometric modulator display, as described herein.

The components of the display device 40 are schematically illustrated in FIG. 15B. The display device 40 includes a housing 41 and can include additional components at least partially enclosed therein. For example, the display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 can provide power to all components as required by the particular display device 40 design.

The network interface 27 includes the antenna 43 and the transceiver 47 so that the display device 40 can communicate with one or more devices over a network. The network interface 27 also may have some processing capabilities to relieve, e.g., data processing requirements of the processor 21. The antenna 43 can transmit and receive signals. In some implementations, the antenna 43 transmits and receives RF signals according to the IEEE 16.11 standard, including IEEE 16.11(a), (b), or (g), or the IEEE 802.11 standard, including IEEE 802.11a, b, g or n. In some other implementations, the antenna 43 transmits and receives RF signals according to the BLUETOOTH standard. In the case of a cellular telephone, the antenna 43 is designed to receive code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless network, such as a system utilizing 3G or 4G technology. The transceiver 47 can pre-process the signals received from the antenna 43 so that they may be received by and further manipulated by the processor 21. The transceiver 47 also can process signals received from the processor 21 so that they may be transmitted from the display device 40 via the antenna 43.

In some implementations, the transceiver 47 can be replaced by a receiver. In addition, the network interface 27 can be replaced by an image source, which can store or generate image data to be sent to the processor 21. The processor 21 can control the overall operation of the display device 40. The processor 21 receives data, such as compressed image data from the network interface 27 or an image source, and processes the data into raw image data or into a format that is readily processed into raw image data. The processor 21 can send the processed data to the driver controller 29 or to the frame buffer 28 for storage. Raw data typically refers to the information that identifies the image characteristics at each location within an image. For example, such image characteristics can include color, saturation, and gray-scale level.

The processor 21 can include a microcontroller, CPU, or logic unit to control operation of the display device 40. The conditioning hardware 52 may include amplifiers and filters for transmitting signals to the speaker 45, and for receiving signals from the microphone 46. The conditioning hardware 52 may be discrete components within the display device 40, or may be incorporated within the processor 21 or other components.

The driver controller 29 can take the raw image data generated by the processor 21 either directly from the processor 21 or from the frame buffer 28 and can re-format the raw image data appropriately for high speed transmission to the array driver 22. In some implementations, the driver controller 29 can re-format the raw image data into a data flow having a raster-like format, such that it has a time order suitable for scanning across the display array 30. Then the driver controller 29 sends the formatted information to the array driver 22. Although a driver controller 29, such as an LCD controller, is often associated with the system processor 21 as a stand-alone Integrated Circuit (IC), such controllers may be implemented in many ways. For example, controllers may be embedded in the processor 21 as hardware, embedded in the processor 21 as software, or fully integrated in hardware with the array driver 22.

The array driver 22 can receive the formatted information from the driver controller 29 and can re-format the video data into a parallel set of waveforms that are applied many times per second to the hundreds, and sometimes thousands (or more), of leads coming from the display's x-y matrix of pixels.

In some implementations, the driver controller 29, the array driver 22, and the display array 30 are appropriate for any of the types of displays described herein. For example, the driver controller 29 can be a conventional display controller or a bi-stable display controller (e.g., an IMOD controller). Additionally, the array driver 22 can be a conventional driver or a bi-stable display driver (e.g., an IMOD display driver). Moreover, the display array 30 can be a conventional display array or a bi-stable display array (e.g., a display including an array of IMODs). In some implementations, the driver controller 29 can be integrated with the array driver 22. Such an implementation is common in highly integrated systems such as cellular phones, watches and other small-area displays In some implementations, the input device 48 can be configured to allow, e.g., a user to control the operation of the display device 40. The input device 48 can include a keypad, such as a QWERTY keyboard or a telephone keypad, a button, a switch, a rocker, a touch-sensitive screen, or a pressure- or heat-sensitive membrane. The microphone 46 can be configured as an input device for the display device 40. In some implementations, voice commands through the microphone 46 can be used for controlling operations of the display device 40.

The power supply 50 can include a variety of energy storage devices as are well known in the art. For example, the power supply 50 can be a rechargeable battery, such as a nickel-cadmium battery or a lithium-ion battery. The power supply 50 also can be a renewable energy source, a capacitor, or a solar cell, including a plastic solar cell or solar-cell paint. The power supply 50 also can be configured to receive power from a wall outlet.

In some implementations, control programmability resides in the driver controller 29 which can be located in several places in the electronic display system. In some other implementations, control programmability resides in the array driver 22. The above-described optimization may be implemented in any number of hardware and/or software components and in various configurations.

The various illustrative logics, logical blocks, modules, circuits and algorithm steps described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and steps described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular steps and methods may be performed by circuitry that is specific to a given function In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

Various modifications to the implementations described in this disclosure may be readily apparent to those having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein. The word "exemplary" is used exclusively herein to mean "serving as an example, instance, or illustration." Any implementation described herein as "exemplary" is not necessarily to be construed as preferred or advantageous over other implementations. Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of the IMOD as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An illumination system, comprising:
   a light guide having a light input edge capable of receiving light from a light source, an opposing edge opposite the light input edge, and transverse edges transverse to the light input edge and opposing edge;
   a reflective structure over a portion of one of the transverse edges of the light guide; and
   an absorber structure over the reflective structure, wherein the absorber structure includes an optical layer over the reflective structure and an absorber layer over the optical layer and wherein the absorber structure has a width greater than a width of the reflective structure to define a gap between the absorber structure and the light guide.

2. The illumination system of claim 1, wherein the reflective structure is electrically conductive.

3. The illumination system of claim 1, wherein the reflective structure includes aluminum.

4. The illumination system of claim 1, wherein the reflective structure is part of a touch sensor wire.

5. The illumination system of claim 1, wherein the absorber structure includes at least one overhanging portion substantially parallel with and laterally protruding past one or more edges of the reflective structure.

6. The illumination system of claim 5, wherein the at least one overhanging portion laterally protrudes past the one or more edges of the reflective structure by a distance between about 100 nm and about 1000 nm.

7. The illumination system of claim 1, wherein the absorber structure includes a black mask structure.

8. The illumination system of claim 7, wherein the black mask structure includes a tri-layer stack of $SiO_2$/MoCr/$SiO_2$.

9. The illumination system of claim 1, wherein the absorber structure has a thickness between about 10 nm and about 250 nm.

10. The illumination system of claim 1, wherein the light guide forms part of a front light of a reflective display.

11. A display system, comprising:
    means for propagating light, wherein the light propagating means includes means for redirecting light;
    means for reflecting light over light propagating means;

means for absorbing light over the light reflecting means, wherein the light absorbing means has a width greater than a width of the light reflecting means to define a gap between the light absorbing means and the light propagating means; and a display facing a major surface of the light propagating means, wherein light redirecting means are configured to direct light to the display.

12. The display system of claim 11, wherein the display has an active area including display elements for producing an image.

13. The display system of claim 12, wherein the display elements are interferometric modulators.

14. The display system of claim 11, further comprising a transparent layer, the light redirecting means in the transparent layer and the light reflecting means above the transparent layer.

15. The display system of claim 14, wherein the transparent layer has an index of refraction approximately equal to an index of refraction of the light propagating means.

16. The display system of claim 11, wherein the light absorbing means includes at least one overhanging portion substantially parallel with and laterally protruding past one or more edges of the light reflecting means.

17. The display system of claim 16, wherein the at least one overhanging portion laterally protrudes past the one or more edges of the light reflecting means by a distance between about 100 nm and about 1000 nm.

18. The display system of claim 11, further comprising a second means for absorbing light over the light redirecting means, wherein the second light absorbing means has a width greater than a width of the light redirecting means.

19. The display system of claim 11, wherein the light redirecting means is selected from the group consisting of facets, refractive features, diffractive features, diffusive features, printed dots, and combinations thereof.

20. The display system of claim 11, further comprising:
a processor that is configured to communicate with the display, the processor
being configured to process image data; and
a memory device that is configured to communicate with the processor.

21. The display system of claim 20, further comprising:
a driver circuit configured to send at least one signal to the display.

22. The display system of claim 21, further comprising:
a controller configured to send at least a portion of the image data to the driver circuit.

23. The display system of claim 20, further comprising:
an image source module configured to send the image data to the processor.

24. The display system of claim 23, wherein the image source module includes at least one of a receiver, transceiver, and transmitter.

25. The display system of claim 20, further comprising:
an input device configured to receive input data and to communicate the input data to the processor.

26. A method of manufacturing an illumination system, comprising:
providing a light guide, wherein the light guide includes:
a light input edge for receiving light from a light source;
an opposing edge opposite the light input edge; and
transverse edges transverse to the light input edge and the opposing edge;
providing a reflective structure over a portion of one of the transverse edges of the light guide; and
providing an absorber structure over the reflective structure, wherein the absorber structure includes an optical layer over the reflective structure and an absorber layer over the optical layer and wherein the absorber structure has a width greater than a width of the reflective structure to define a gap between the absorber structure and the light guide.

27. The method of claim 26, further comprising providing an etch stop layer between the reflective structure and the absorber structure.

28. The method of claim 26, wherein providing the reflective structure includes depositing an electrically conductive material.

29. The method of claim 26, wherein providing the absorber structure includes providing overhanging portions substantially parallel with and laterally protruding one or more edges of the reflective structure.

30. The illumination system of claim 1, wherein the absorber layer is spaced apart from the reflective structure by a thickness of the optical layer.

31. The display system of claim 11, further comprising:
means for optically transmitting light between the light absorbing means and the light reflecting means, wherein the light absorbing means is spaced apart from the light reflecting means by a thickness of the means for optically transmitting light.

32. The method of claim 26, wherein the absorber layer is spaced apart from the reflective structure by a thickness of the optical layer.

* * * * *